(12) United States Patent
Ovshinsky et al.

(10) Patent No.: US 6,672,078 B2
(45) Date of Patent: *Jan. 6, 2004

(54) HYDROGEN INFRASTRUCTURE, A COMBINED BULK HYDROGEN STORAGE/SINGLE STAGE METAL HYDRIDE HYDROGEN COMPRESSOR THEREFOR AND ALLOYS FOR USE THEREIN

(75) Inventors: Stanford R. Ovshinsky, Bloomfield Hills, MI (US); Rosa T. Young, Bloomfield Hills, MI (US); Baoquan Huang, Troy, MI (US); Farshad Bavarian, Rochester, MI (US); Gene Nemanich, Sugar Land, TX (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/367,060

(22) Filed: Feb. 14, 2003

(65) Prior Publication Data

US 2003/0150218 A1 Aug. 14, 2003

Related U.S. Application Data

(63) Continuation of application No. 09/902,320, filed on Jul. 10, 2001, now Pat. No. 6,591,616, which is a continuation-in-part of application No. 09/444,810, filed on Nov. 22, 1999, now Pat. No. 6,305,442, which is a continuation-in-part of application No. 09/435,497, filed on Nov. 16, 1999, now Pat. No. 6,193,929.

(51) Int. Cl.[7] .............................. B67D 5/06; C22C 23/00
(52) U.S. Cl. ........................ 62/46.2; 141/110; 420/402; 420/900
(58) Field of Search ................................. 62/46.2, 46.3; 141/110; 420/402, 900

(56) References Cited

U.S. PATENT DOCUMENTS 6,536,487 B2 * 3/2003 Ovshinsky et al. ......... 141/231
2002/0029820 A1 * 3/2002 Ovshinsky et al. ......... 141/110

* cited by examiner

*Primary Examiner*—William C. Doerrler
(74) *Attorney, Agent, or Firm*—Frederick W. Mau II; David W. Schumaker; Marvin S. Siskind

(57) ABSTRACT

A combine bulk storage/single stage metal hydride compressor, a hydrogen storage alloy therefore and a hydrogen transportation/distribution infrastructure which incorporates the combine bulk storage/single stage metal hydride compressor.

13 Claims, 17 Drawing Sheets ature by controlling the particle and grain size, topology, surface states, catalytic activity, microstructure, and total interactive environments for storage capacity.

HYDROGEN INFRASTRUCTURE, A COMBINED BULK HYDROGEN STORAGE/ SINGLE STAGE METAL HYDRIDE HYDROGEN COMPRESSOR THEREFOR AND ALLOYS FOR USE THEREIN

CROSS REFERENCE TO RELATED APPLICATIONS

The present invention is a continuation of, and is entitled to the benefit of the earlier filing date and priority of, U.S. patent application Ser. No. 09/902,320, filed Jul. 10, 2001, now U.S. Pat. No. 6,591,616 which is assigned to the same assignee as the current application, entitled "A HYDROGEN INFRASTRUCTURE, A COMBINED BULK HYDROGEN STORAGE/SINGLE STAGE METAL HYDRIDE HYDROGEN COMPRESSOR THEREFOR AND ALLOYS FOR USE THEREIN", filed Jul. 10, 2001, which is a continuation-in-part of U.S. patent application Ser. No. 09/444,810, filed Nov. 22, 1999, now U.S. Pat. No. 6,305,442, which is a continuation-in-part of U.S. patent application Ser. No. 09/435,497, filed Nov. 16, 1999, now U.S. Pat. No. 6,193,929, the disclosures of which are hereby incorporated by reference.

FIELD OF THE INVENTION

The instant invention relates generally to a hydrogen infrastructure. More particularly, there is described herein the use of single stage metal hydride hydrogen compressors which also act as bulk hydrogen storage units for use in such a hydrogen infrastructure. These compressors are safe, efficient and reliable compressors having no moving parts to wear out. The compressors enable delivery of hydrogen for, by way of example and not limitation, refueling internal combustion engine or fuel cell vehicles.

BACKGROUND

Previously, in U.S. application Ser. No. 09/444,810 (the disclosure of which is incorporated herein by reference) a complete generation, storage, transportation, and delivery system for a hydrogen-based economy was described. This was made possible by hydrogen storage alloys that have surmounted the chemical, physical, electronic and catalytic barriers that have heretofore been considered insoluble. These alloys are fully described in U.S. Pat. No. 6,193,929 ('929) to Ovshinsky et al, the disclosure of which is incorporated herein by reference. This patent relates generally and specifically to alloys which solved the unanswered problem of having sufficient hydrogen storage capacity with exceptionally fast kinetics to permit the safe and efficient storage of hydrogen to provide fuel for a hydrogen based economy, such as powering internal combustion engine and fuel cell vehicles. A complete infrastructure system from "source to wheel" is the subject of U.S. application Ser. No. 09/444,810.

In the '929 patent the inventors for the first time disclosed the production of Mg-based alloys having both hydrogen storage capacities higher than about 6 wt. % and extraordinary kinetics. This revolutionary breakthrough was made possible by considering the materials as a system and thereby utilizing chemical modifiers and the principles of disorder and local order, pioneered by Stanford R. Ovshinsky (one of the instant inventors), in such a way as to provide the necessary catalytic local order environments, such as surfaces and at the same time designing bulk characteristics for storage and high rate charge/discharge cycling. In other words, these principles allowed for tailoring of the material Hydrogen is the "ultimate fuel" for the next millennium, and, it is inexhaustible. Hydrogen is the most plentiful element in the universe and can provide an inexhaustible, clean source of energy for our planet which can be produced by various processes which split water into hydrogen and oxygen. The hydrogen can be stored and transported in solid state form.

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun which is composed mainly of hydrogen and can, itself, be thought of as a giant hydrogen "furnace". Moreover hydrogen can be produced without the use of fossil fuels, such as by the electrolysis of water using nuclear or solar energy, or any other form of economical energy (e.g., wind, waves, geothermal, etc.). Furthermore, hydrogen, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependency on oil, etc., as well as providing a means of helping developing nations.

One of the major problems in utilizing hydrogen has been the need for a simple, efficient, reliable and cost effective means for compressing and simultaneously storing hydrogen. Metal hydride hydrogen compressors are known in the prior art. See, for example, U.S. Pat. Nos. 4,085,590; 4,402, 187; 4,505,120; and 4,995,235. These hydrogen compressors all have common deficiencies, one of which is that they are energy inefficient. This is because they require multiple stages to compress the hydrogen from a low pressure to a higher (useful) pressure and each of these stages is not energy efficient. Each stage of the compression requires a heating and cooling cycle. This heating and cooling causes losses of up to one fifth of the useful energy (of combustion of the hydrogen) per cycle in waste heat. Thus, it would be useful to have a compressor which can compress the hydrogen from a low pressure to a high pressure in a single stage and thereby minimize the wasted heat.

In addition to the energy losses of multiple compression stages, these compressors do not achieve bulk storage of the hydrogen. Thus, the compressed hydrogen must be stored in gas tanks of other such storage units. This inability to provide for integrated compression and bulk storage exacerbates the heat loss problem, because each stage of the compressor must cycle very many times to provide useful quantities, while a combine storage and compression unit will only require one heating/cooling cycle to provide very large quantities of hydrogen.

Additionally, even if the prior art compressors tried to create bulk storage in their compressors, there remains the fact that the Mm-Ni type alloys have inherently low storage capacities (less than 1.5 wt. %) and cycling at temperatures higher than about 150° C. causes the Mm alloys to form highly stable hydrides which will no longer cycle. Therefore these devices would be unreliable at the higher temperatures required for high pressures.

Thus, there remains a compelling and crucial a need in the art for a combined bulk storage and compression apparatus which is safe, efficient, reliable, cost effective and capable of storing and delivering large quantities of high pressure hydrogen. The combined bulk storage/single stage metal hydride hydrogen compressor of the instant invention overcomes the limitations of the prior art.

SUMMARY OF THE INVENTION

The objects of the instant invention include a combine bulk storage/single stage metal hydride compressor and a hydrogen storage alloy therefore. The instant invention also includes a hydrogen transportation/distribution infrastructure which incorporates the combine bulk storage/single stage metal hydride compressor. The combined bulk hydrogen storage/single stage metal hydride hydrogen compressor includes 1) a pressure containment vessel, which has at least one hydrogen inlet/outlet port for transferring hydrogen into and out of the vessel; 2) a hydrogen storage alloy disposed with the containment vessel, the hydrogen storage alloy being in sufficient quantity to provide for bulk storage of hydrogen and the hydrogen storage alloy having a plateau pressure of less than or equal to 500 psi at a temperature of less than or equal to 25° C. and a plateau pressure greater than or equal to 1500 psi at a temperature of less than or equal to 200° C.; and 3) a thermal management system for alternately heating and cooling the hydrogen storage alloy.

More preferable are alloys have a plateau pressure less than or equal to 400 psi at a temperature of less than or equal to 25° C. and a plateau pressure greater than or equal to 2000 psi at a temperature of less than or equal to 200° C. Even further preferred alloys have a plateau pressure less than or equal to 300 psi at a temperature of less than or equal to 25° C. and a plateau pressure greater than or equal to 3600 psi at a temperature of less than or equal to 200° C. Further preferred alloys have a plateau pressure less than or equal to 200 psi at a temperature of less than or equal to 25° C. and a plateau pressure greater than or equal to 5000 psi at a temperature of less than or equal to 200° C. The most preferred alloys have a plateau pressure of about 100 psi at a temperature of about 12° C. and a plateau pressure of about 6000 psi at a temperature of about 180° C.

Specifically the hydrogen storage alloy is an alloy is an $AB_2$ alloy, such as a modified Ti—$Mn_2$ alloy comprising, in atomic percent 2–5% Zr, 26–32% Ti, 7–10% V, 8–20% Cr, 38–42% Mn; and at least one element selected from the group consisting of 1–6% Ni, 2–6% Fe and 0.1–2% Al. The alloy may further contain up to 1 atomic percent Misch metal. Examples of such alloys include in atomic percent: 1) 3.63% Zr, 29.8% Ti, 8.82% V, 9.85% Cr, 39.5% Mn, 2.0% Ni, 5.0% Fe, 1.0% Al, and 0.4% Misch metal; 2) 3.6% Zr, 29.0% Ti, 8.9% V, 10.1% Cr, 40.1% Mn, 2.0% Ni, 5.1% Fe, and 1.2% Al; 3) 3.6% Zr, 28.3% Ti, 8.8% V, 10.0% Cr, 40.7% Mn, 1.9% Ni, 5.1% Fe, and 1.6% Al; and 4) 4% Zr, 29.5% Ti, 8.5% V, 15.0% Cr, 38% Mn, 5% Ni.

The hydrogen transportation/distribution infrastructure system includes at least 1) a hydrogen purification/compression subsystem which purifies and compresses hydrogen; and 2) a hydrogen distribution subsystem which distributes hydrogen to end users, where one or both of these subsystems incorporates the combined bulk hydrogen storage/single stage metal hydride hydrogen compressor of the instant invention.

The hydrogen transportation/distribution infrastructure system may further include: a) a power generation subsystem; b) a hydrogen generation subsystem which uses power from said power generation subsystem to produce hydrogen; c) a hydrogen storage subsystem which stores purified and compressed hydrogen from said a hydrogen purification/compression subsystem in metal hydride storage tanks; d) a hydrogen transportation subsystem which transports the stored hydrogen in metal hydride storage tanks; and e) an end-use subsystem which receives distributed hydrogen from said hydrogen distribution subsystem and consumes said hydrogen.

DETAILED DESCRIPTION OF THE INVENTION

Figure 1:
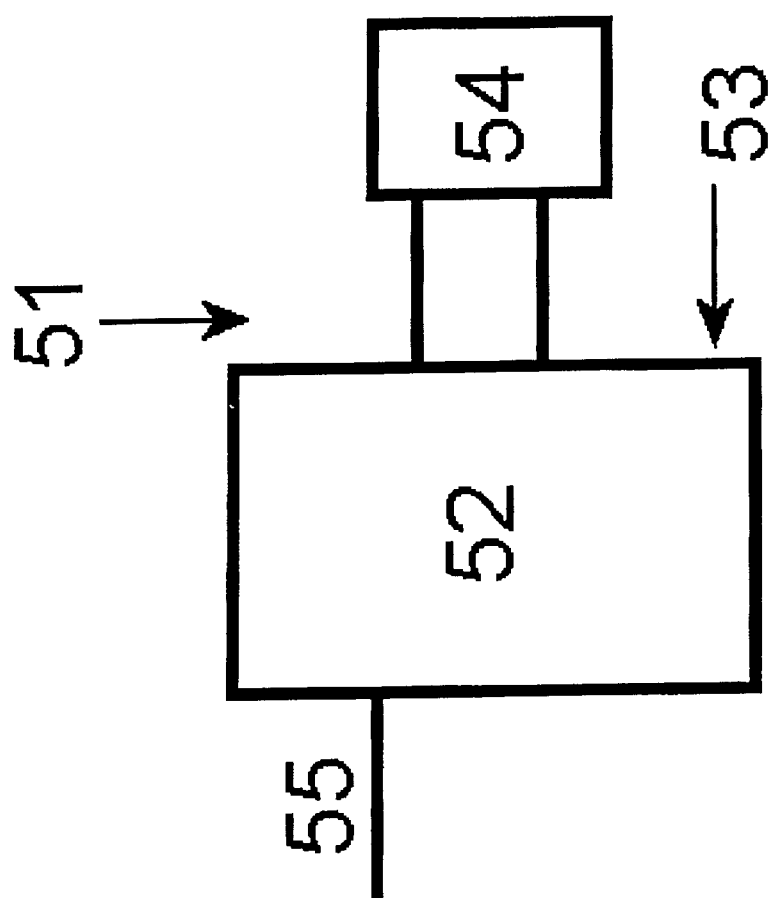
FIG. 1 is a stylistic depiction of the combine bulk storage/single stage metal hydride compressor of the instant invention.

The instant invention consists of a combine bulk storage/single stage metal hydride compressor, alloys useful therein and a hydrogen transportation/distribution infrastructure using the combined storage/compressor. Hereinafter the terms "combine bulk storage/single stage metal hydride compressor", "combined storage/compressor" and "compressor" are used synonymously. In it's simplest conceptual form, the compressor 51 is shown in FIG. 1. The compressor consists of a hydrogen storage alloy 52 disposed in a pressure containment vessel 53. The compressor also includes a thermal management system 54, which alternately heats and cools the hydrogen storage alloy depending on whether it is being charged at low pressure hydrogen (the alloy is cooled) or stored hydrogen is being compressed for discharging (the alloy is heated). The compressor also includes in input/output line 55 through which hydrogen is supplied/removed to/from the hydrogen storage alloy 52.

The thermal management system 54 can be any type of system known in the art, as long as it can add or remove heat from the storage alloy 52. While the thermal management system is depicted as a separate unit from the storage unit in FIG. 1, it need not be. In fact integration of the thermal management unit 54 will provide uniformity of heating and cooling. On type of integrated thermal management system that is particularly useful in the compressor of the instant invention is disclosed in U.S. patent application Ser. No. 09/742,827, filed Dec. 20, 2000, and entitled "HYDROGEN STORAGE BED SYSTEM INCLUDING AN INTEGRATED THERMAL MANAGEMENT SYSTEM", the disclosure of which is incorporated herein by reference.

The pressure container 53 can be formed from any material or materials that contains the equilibrium pressure of hydrogen at the operating temperatures of the compressor 51. The materials must also be non-reactive with the stored hydrogen and the hydrogen storage alloy 52 and must withstand the typical operating temperatures of the system. The materials must also prevent hydrogen diffusion therethrough and be immune to hydrogen embrittlement over the lifetime of the container. The temperatures and pressures will of course depend on the particular storage alloy 52 that is used. Typically for the alloys disclosed herein, the pressures can range up to 500 bar, and temperatures will range up to 200° C. Typical construction materials for the pressure container 53 can include metals such as stainless steels. The pressure container 53 can also be made thermally insulating by constructing the container out of insulating materials or by insulating the exterior or interior of a thermally conductive material such as a metal. Whether or not the pressure container 53 is insulated will depend on whether or not external heating and cooling through the pressure container are employed. If there is external heating and cooling, then insulating the pressure container 53 would defeat the purpose thereof. The pressure container 53 can also be made of fiber reinforced polymeric materials such as carbon fiber reinforced epoxy materials, etc., alone or in conjunction with other materials (i.e. a multilayer pressure container). The advantage of such fiber reinforced polymer and multilayer construction materials is savings in weight.

Generally the bulk hydrogen storage alloys 52 which are useful in the combined storage/compressor of the instant invention are those which have a plateau pressure of less than or equal to 500 psi at a temperature of less than or equal to 25° C. and a plateau pressure greater than or equal to 1500 psi at a temperature of less than or equal to 200° C. More preferable are alloys have a plateau pressure less than or equal to 400 psi at a temperature of less than or equal to 25° C. and a plateau pressure greater than or equal to 2000 psi at a temperature of less than or equal to 200° C. Even further preferred alloys have a plateau pressure less than or equal to 300 psi at a temperature of less than or equal to 25° C. and a plateau pressure greater than or equal to 3600 psi at a temperature of less than or equal to 200° C. Further preferred alloys have a plateau pressure less than or equal to 200 psi at a temperature of less than or equal to 25° C. and a plateau pressure greater than or equal to 5000 psi at a temperature of less than or equal to 200° C. The most preferred alloys have a plateau pressure of about 100 psi at a temperature of about 12° C. and a plateau pressure of about 6000 psi at a temperature of about 180° C.

The hydrogen storage alloys are generally $AB_2$ alloys and more specifically modified $TiMn_2$ alloys. A specific alloy family useful for the combined storage/compressor of the instant invention is, in atomic percent, 2–5% Zr, 26–32% Ti, 7–10% V, 8–20% Cr, 38–42% Mn; and at least one element selected from the group consisting of 1–6% Ni, 2–6% Fe and 0.1–2% Al. The alloys may also contain up to about 1 atomic percent Misch metal (Mm). Three specific alloys which fall within this family are (in atomic percent):

TABLE 1

| Alloy | Zr | Ti | V | Cr | Mn | Ni | Fe | Al | Mm |
|---|---|---|---|---|---|---|---|---|---|
| Ov350 | 4 | 29.5 | 8.5 | 15 | 38 | 5 | — | — | — |
| Ov539 | 3.63 | 29.8 | 8.82 | 9.85 | 39.5 | 2.0 | 5.0 | 1.0 | 0.4 |
| Ov586 | 3.6 | 29.0 | 8.9 | 10.1 | 40.1 | 2.0 | 5.1 | 1.2 | — |
| Ov587 | 3.6 | 28.3 | 8.8 | 10.0 | 40.7 | 1.9 | 5.1 | 1.6 | — |

Figure 3:
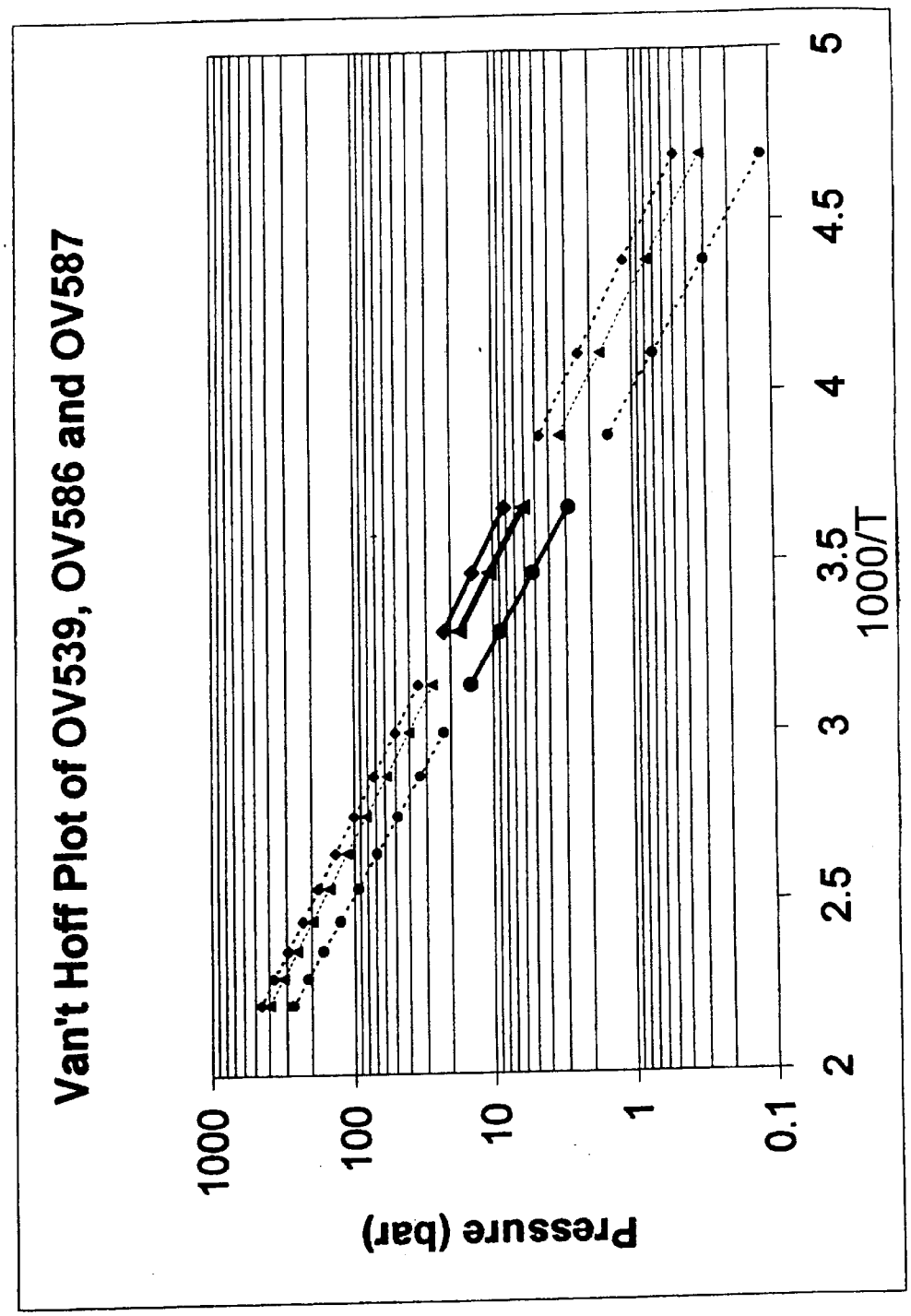
FIG. 3 is a Van't Hoff plot of three hydrogen storage alloys useful for the combine bulk storage/single stage metal hydride compressor of the instant invention.

FIG. 3 is a Van't Hoff plot of the three alloys of Table 1. Specifically plotted is the equilibrium (plateau) pressure of released hydrogen (on a log scale) versus 1000/T (where T is the temperature of the alloy in degrees Kelvin). The three curves correspond to Ov539 (symbol ●); Ov586 (symbol ▲); and Ov587 (symbol ♦). As can be seen, all of the alloys have an equilibrium (plateau) pressure of less than 135 psi (9 bar) at a temperature of 0° C. and an equilibrium pressure of less than 180 psi (14 bar) at a temperature of 30° C. The alloys also have an equilibrium pressure of over about 4000 psi (270 bar) at a temperature of about 180° C.

The $AB_2$ alloys of the instant invention have a hydrogen storage capacity of at least 1.65 wt. % and more preferably at least 1.9 wt. % and most preferably at least 2.2 wt. %.

While the alloys of the instant invention can be pyrophoric, they can also be non-pyrophoric, if need be, using the principles of atomic engineering disclosed by Ovshinsky et al. in U.S. patent application Ser. No. 09/873,863, to Ovshinsky et al., filed Jun. 4, 2001 entitled "NON-PYROPHORIC HYDROGEN STORAGE ALLOYS", the disclosure of which is incorporated herein by reference.

Figure 2:
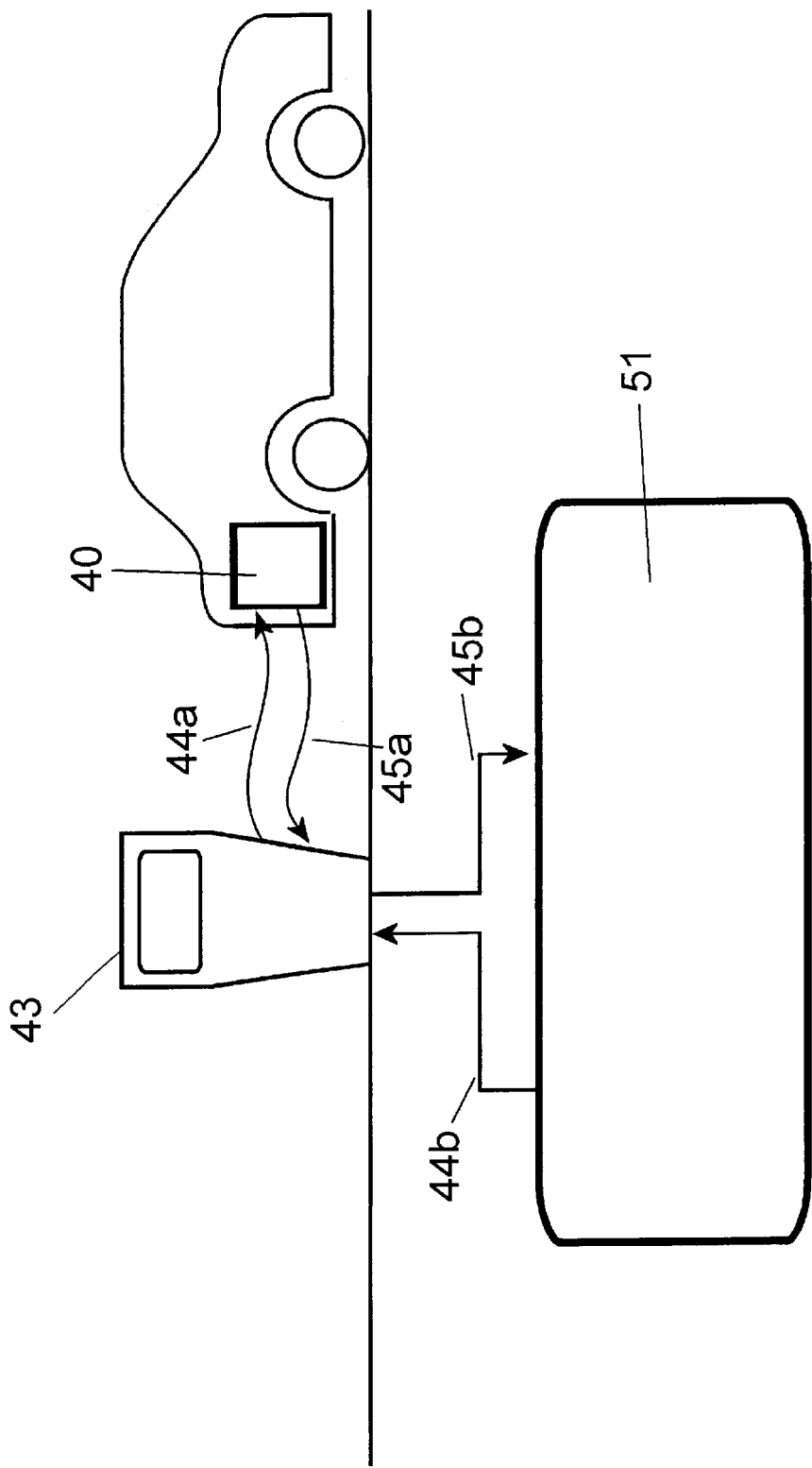
FIG. 2 is a stylistic depiction of a hydrogen refueling station incorporating the combine bulk storage/single stage metal hydride compressor of the instant invention.

FIG. 2 is a stylistic depiction of a hydrogen refueling station which specifically shows how hydrogen pumped from compressor 51 (also serving as a storage unit), and waste heat of hydride formation which produced within a vehicles storage unit 40 is captured and transferred to the stations hydride compressor/storage bed 51 to assist in heating the hydrogen storage alloy for compression and release of hydrogen therefrom. Specifically, high pressure hydrogen is dispensed from the meter 43 into the vehicle's hydrogen storage bed 40 through hydrogen supply line 44a. Some or all of the hydrogen is absorbed into the hydrogen storage material within the bed, thereby releasing heat of hydride formation. This heat is removed either by excess hydrogen flow or some other form of cooling such as cooling water, etc. Heat leaves storage bed 40 and is transported to the meter 43 via hot coolant return line 45a. The coolant is then transported from the meter 43 to the stations compressor/hydrogen storage bed 51 via hot coolant return line 45b. The hot coolant releases its heat into the hydrogen storage material within compressor 51 to assist in providing the required heat (heat of dehydriding) to maintain the proper compression and release the stored hydrogen therein. The released hydrogen, is supplied to the meter 43, via hydrogen supply line 44b, to ultimately be sent to the vehicles hydrogen storage bed 40. This set up allows for very fast charging of a vehicles storage bed 40 at relatively high pressures, and yet eliminates waste of the released heat and overheating of the bed 40.

It should be noted that while the hydrogen refueling station was described in relation to heating the compressor using the waste heat from the vehicle's storage tank, other sources of heating the compressor and cooling the vehicle's storage tank can be used. For example, if hydrogen is being produced on-site via a reformation process, the waste heat from the reformation process can be used to heat the compressor. Natural gas or electric heat are also usable if no waste heat is available. Additionally, water can be used to cool the vehicle's storage tank, such as for example the refueling station's city water supply, etc. City water can also be used to remove the heat from the compressor during recharging and for faster, higher capacity recharging, liquid nitrogen can be used.

It should also be noted that while FIG. 2 seems to depict the compressor as an underground tank, it can equally be a portable unit that is trucked into the refueling station in a precharged state. This is so because at ambient temperatures, the hydrogen pressure is quite low. One particular advantage of the compressor of the instant invention is that is can be charged at low pressure (150–400 psi) using hydrogen directly from a reformer or an electrolyzer.

Figure 4:
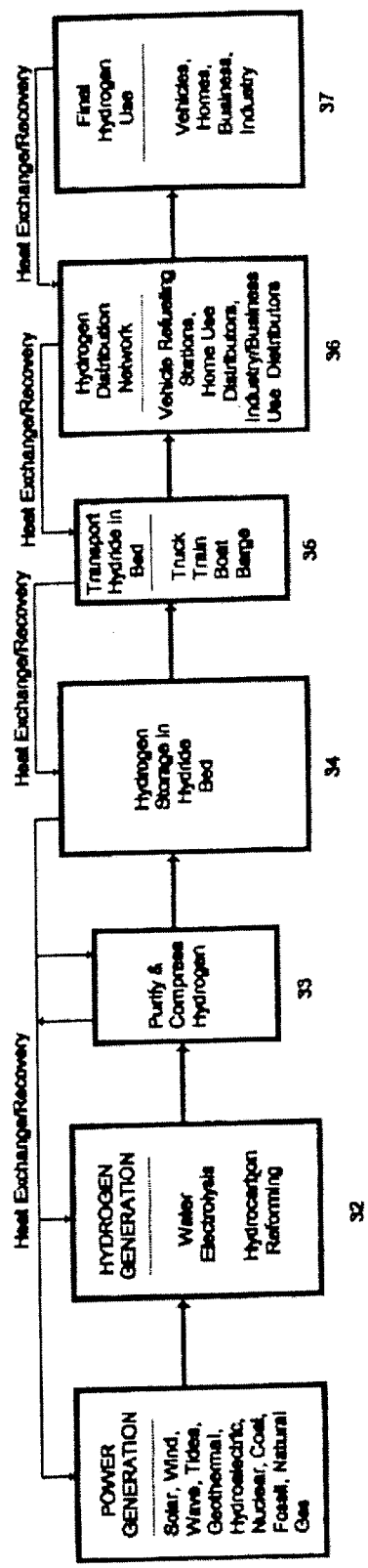
FIG. 4 is a stylistic depiction of the complete infrastructure system for the generation/storage/transportation/delivery of hydrogen of the instant invention in which the combine bulk storage/single stage metal hydride compressor of the instant invention is useful.

Generally the infrastructure system is a hydrogen production/distribution system in which waste heat generated in any subsystem thereof is recovered and reused in other subsystems. Thus, the thermal energy budget for the entire system is optimized for the most efficient use of heat energy. FIG. 4 is a stylistic depiction of the complete infrastructure system for the generation/storage/transportation/delivery of hydrogen, which in turn makes a hydrogen ecosystem possible. In order for this infrastructure system to be highly energy efficient, high capacity, low cost, light weight Ovonic thermal hydrogen storage alloy materials having exceptionally fast kinetics are used to store the hydrogen. The system includes the following subsystems: 1) power generation 31; 2) hydrogen generation 32; 3) hydrogen purification/compression 33; 4) hydrogen storage in hydride beds 34; 5) hydride bed transportation via truck, train, boat, barge, etc. 35; 6) a hydrogen distribution network 36; and 7) hydrogen end use 37. Throughout this infrastructure heat of hydride formation (i.e., $M+\frac{1}{2}H_2 \rightarrow MH+heat$) is recovered for reuse, such as for releasing hydrogen from a source hydride bed or for hydrogen/power generation. As used herein, the term "waste heat" will refer generally to any form of useable heat generated in any of the processes of the infrastructure that would normally be lost or discarded to the surrounding environment.

Heat Exchange/Thermal Recovery

As alluded to above, one very important aspect within and throughout the entire infrastructure system and all of it's subsystems, is the recovery and reuse of heat generated by many of the processes involved. This greatly reduces the additional energy burden for heating the hydride beds to release the stored hydrogen and makes efficient use of waste heat, thus eliminating the need to release the heat into the environment.

One such heat recovery is available in the combination of subsystems 31, 32, 33 and 34. The first place heat can be recovered is from the exothermic hydride reaction that occurs in subsystem 34 when the hydrogen is stored in the hydride bed. The waste heat can be transferred to the other subsystems as needed, for example to generate power in subsystem 31 or to produce hydrogen in subsystem 32 or as needed to compress or purify the hydrogen in subsystem 33. Also, any excess heat in the purification and compression of hydrogen in subsystem 33 can be transferred to subsystems 31 or 32.

The next place for heat recovery is in the hydrogen transfer from subsystem 34 to subsystem 35. This assumes that the hydrogen is stored in stationary storage tanks in subsystem 34 and is transferred to mobile tanks for transportation in subsystem 35. The heat of hydride formation in subsystem 35 can be used to heat up the hydride beds of subsystem 34 to release the stored hydrogen.

Further heat recovery can be employed in the hydrogen transfer from subsystem 35 to subsystem 36. Once again this assumes that the hydrogen is stored in the mobile tanks of subsystem 35 is transferred to stationary tanks at the distribution network in subsystem 36. The heat of hydride formation in subsystem 36 can be used to heat up the hydride beds of subsystem 35 to release the stored hydrogen.

Finally, heat can be recovered in the hydrogen transfer from subsystem 36 to subsystem 37. The heat of hydride formation in subsystem 36 can be used to heat up the hydride beds of subsystem 35 to release the stored hydrogen. Assuming of course that there is a local transfer of hydrogen from one subsystem to another and not a local pipeline distribution of hydrogen.

The most useful and simplest way to perform this heat exchange (i.e. cool the hydride bed as absorption is occurring) is via high-flow-rate hydrogen gas cooling. Thus, as hydrogen is being absorbed by the hydride bed, an excess of hydrogen gas is flowing through the bed to carry away the heat of hydride formation. This method of cooling/heat transfer, simplifies bed designs, and separate cooling medium channels are not required.

The Power Generation Subsystem 31

The first step in the hydrogen generation/storage/transportation/delivery system is the generation of power. No matter how the hydrogen is produced, some source of power is needed. Examples of "non-polluting" sources of power include wind power, solar power, geothermal power, wave power, hydroelectric power, and ocean thermal energy conversion (OTEC) power. Other sources of power include creation of power via the combustion of hydrocarbons or fossil fuels such as coal, oil, and natural gas and nuclear power. Any individual means or combination thereof could suffice to produce the power needed. The most convenient form of power to produce would typically be electrical, because electrical energy is easily converted into other forms of energy and is useful in direct electrolysis of water to form hydrogen and oxygen.

The most useful means to create the power is via solar energy. For example, economical, lightweight, triple-junction amorphous silicon solar cells solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency solar panels on nearby farms, in water, or on land. Electricity can be generated to transport and pump the hydrogen into metal hydride storage beds.

The Hydrogen Generation Subsystem 32

Once power has been generated in the power generation subsystem 31, at least a portion of the power is then used to generate hydrogen. The presently used concepts for hydrogen production on a commercial basis are steam reforming of natural gas, partial oxidation of oil products and electrolysis of water. Of these systems, the preferred method (although presently not the most economical method) is the electrolysis of water. This method is preferred because the starting materials are water and electricity, both of which are completely renewable, since the byproduct of hydrogen "burning" is water, and electricity can be produced from renewable sources of energy (i.e., solar, wind, geothermal, waves, etc.). Reformation or partial oxidation of hydrocarbons, on the other hand, uses a depletable hydrocarbon source, along with thermal energy and water.

One useful type of electrolysis is solid polymer electrolyte electrolysis. This method is expected to be highly efficient and have lower cost than conventional hydrogen production methods. The polymer ion exchange membrane is used as the electrolyte and the electrodes are directly attached to the membrane. Using this technique, high energy efficiency can be achieved. Using pure water as circular fluid without alkali makes it easier to maintain equipment than conventional alkaline water electrolysis methods.

Another method of producing hydrogen is via photoelectrolysis. The generation of hydrogen using a photoanode in an electrochemical cell requires at least one counter electrode in an electrolyte. The electrochemical cell can utilize either a photocathode or a conventional metal cathode with the photoanode. The electrolyte may be either acidic or alkaline. When the electrolyte is acidic, the reaction at the counter electrode is:

$$2H^+ + 2e^- \rightarrow H_2 \quad (a)$$

This reaction proceeds in the dark as sufficient electrons are available. At the photoanode, the reaction is:

$$H_2O + 2H^+ \rightarrow 2H^+ + \tfrac{1}{2}O_2 \quad (b)$$

When the electrolyte is alkaline, the reaction at the counter electrode is:

$$H_2O + e^- \rightarrow H_2 + OH^- \quad (c)$$

and the reaction at the photoanode is:

$$2OH^- + 2H^+ \rightarrow H_2O + \tfrac{1}{2}O_2 \quad (d)$$

As an example, when an n-type semiconductor photoanode is exposed to light, the electrons are excited from the valence band to the conduction band, thereby creating holes in the valence band and free electrons in the conduction band. The electrons produced at the photoanode are conducted by means of an external electrical connection to the counter electrode where the electrons combine with hydrogen ions of water molecules in the electrolytic solution to produce hydrogen gas. At the photoanode, the electrons are provided from the hydroxyl ions in the solution to fill the holes created by the excited electrons of the photoanode and evolve oxygen.

To create a good charge separation between the electrons and holes at the photoanode, a positive potential, for example, 0.5 volts, is applied to bend the conduction and valence bands. This creates a field to prevent electrons excited to the conduction band from recombining with the holes created in the valence band upon the absorption of light energy. The bank bending also tends to direct the excited electrons into the electrical circuit and the holes to the surface of the photoanode where they can combine more readily with hydroxyl ions provided by the electrolyte.

By selecting a semiconductor with a conduction band level more negative than the $H_2O/H_2$ energy level, the electrolysis of water can be accomplished solely through the use of solar energy. At least a portion of the electrode potential of the reaction can be supplied by light to reduce the energy required from an external power source.

For optimum efficiency, the semiconductor utilized for the photoanode should have a band gap in the approximate range of 1.5 to 1.7 eV with a Fermi level which is compatible with the electrolytic solution. For an n-type semiconductor, the water elctrolysis process proceeds best when the semiconductor has a band gap slightly greater than 1.5 eV. A small work function is also desirable so that electrons diffuse into the water to attain thermal equilibrium. This causes the energy bands of the semiconductor to bend up near the interface of the electrolyte. The incident light is then absorbed in the semiconductor creating electron-hole pairs. The photoexcited holes are accelerated towards the semiconductor-electrolyte interface by the internal field. When holes are injected into the water at the correct energy, oxygen is evolved near the photoanode and hydrogen is evolved near the counter electrode according to the reactions previously described in equations a and b, or c and d, depending upon whether an acidic or alkaline system is utilized. Specific photoelectrodes for use in such a photoelectrolysis system are described in U.S. Pat. Nos. 4,511,638 and 4,656,103, both assigned to the assignee of the instant invention, the disclosures of which are hereby incorporated by reference.

It should be noted that the hydrogen produced via electrolysis and/or reformation can be easily and directly stored in the compressor units of the instant invention, which is particularly useful for on-site production of hydrogen and/or portable compressor units.

The Hydrogen Purification and Compression Subsystem 33

Once hydrogen has been produced in the hydrogen generation subsystem, it may need to be purified (i.e. harmful, or inert components need to be removed), and compressed for delivery or storage. The most useful way to purify the hydrogen is to pass it through a selective hydrogen filter. Typical filters alloy hydrogen to pass through, but prevent any other gases from passing through. Filters of this sort can be made from Pd alloys, or more preferentially (due to cost considerations) from low cost hydrogen storage materials. That is, conventional filters are very expensive and can easily be replace with Ovonic hydrogen storage materials, which are low cost and efficiently filter hydrogen out of gas streams. In addition to such a filter, other useful components of a hydrogen purifier may include oxygen and/or water scavengers.

As for compression, the hydrogen is compressed via the combined bulk storage/single stage metal hydride compressor of the instant invention described herein above. It should be noted that the compressor of the instant invention does not directly purify hydrogen. Also, the hydrogen storage and compression can be in a single unit which will in some instances combine this subsystem with the storage and transportation subsystems.

The Hydrogen Storage Subsystem 34

Once the hydrogen has been purified and compressed in subsystem 33, the hydrogen needs to be stored. As discussed above, the most economical and safest method for storing the hydrogen is in the form of a solid hydride. The alloys are typically contained in "bed" form in a storage tank. The hydrogen is pumped into the storage tank and absorbed by the hydride alloy, which then stores the hydrogen until it is needed.

While the discussion herein below contemplates storage of hydrogen in units for transportation using magnesium alloys, the present storage/compressor unit can serve as the preferred storage unit (even for transportation) in some instances.

In general useful alloys for transportation in separate storage units contain greater than about 90 weight % magnesium, and contain at least one modifier element. The at least one modifier element creates a magnesium based alloy which is capable of storing at least 6 weight % hydrogen and which is capable of absorbing at least 80% of the full storage capacity of hydrogen in under 5 minutes at 300° C. More preferably the modified alloy stores at least 6.5 weight % hydrogen and is capable of absorbing 80% of the full storage capacity of hydrogen in under 2 minutes at 300° C. Most preferably the modified alloy stores at least 6.9 weight % hydrogen and is capable of absorbing 80% of the full storage capacity of hydrogen in under 1.5 minutes at 300° C. The modifier elements mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce, La, Pr, and Nd). The alloy may also contain one or more of 3–7 weight % Al, 0.1–1.5 weight % Y and 0.3–1.5 weight % silicon. Also, optionally, a small amount (up to 1%) of light elements such as carbon and/or boron, may be added to the alloy to increase the number of catalytically active sites therein. A few examples will help to illustrate the preferred hydrogen storage alloys.

EXAMPLE 1

A modified Mg alloy having the designation FC-10 was made which has the composition: 91.0 wt. % Mg, 0.9 wt. % Ni, 5.6 wt. % Al, 0.5 wt. % Y and 2.0 at % Mm. The individual raw alloying elements were mixed in a glove box. The mixture was placed in a graphite crucible and the crucible was placed in a furnace. The crucible had a 2.0 mm boron nitride orifice at the bottom thereof which is plugged by a removable boron nitride rod. The furnace was pumped down to very low pressure and purged three times with argon. The argon pressure within the furnace was brought up to 1 psi and kept at this pressure as the crucible was heated to 600° C. Once the melt was ready, the boron nitride rod was lifted and argon was injected into the furnace under pressure. The molten alloy flowed out of the graphite crucible through the boron nitride orifice and onto a non-water-cooled, horizontally spinning, copper wheel. The wheel, which spins at about 1000 rpm, solidifies the molten alloy into particles which then bounce off a water-cooled copper cap which covers the spinning wheel, and drop into a stainless steel pan where they gradually cool. Five grams of the solidified alloy flakes were mixed with 100 mg of graphite grinding aid. The mixture was mechanically ground for 3 hours. The ground alloy was then classified by sieving to recover material having a particle size of between 30 and 65 microns. This alloy has a storage capacity of about 6.5 wt. % hydrogen and absorbs 80% of the maximum capacity in less than 5 minutes at a temperature of about 300° C. Other details of the alloy properties are presented below.

EXAMPLE 2

A modified Mg alloy having the designation FC-76 was made which has a composition: 95.6 wt. % Mg, 1.6 wt. % Ni, 0.8 wt. % Si and 2.0 wt % Mm. The alloy was formed in the same manner as Example 1, however, the furnace temperature was 850° C. and the orifice size was 2.5 mm. This alloy has a storage capacity of about 6.9 wt. % hydrogen and absorbs 80% of the maximum capacity in less than 1.5 minutes at a temperature of about 300° C. Other details of the alloy properties are presented below.

EXAMPLE 3

A modified Mg alloy having the designation FC-86 was made which has a composition: 95 wt. % Mg, 2 wt. % Ni and 3.0 wt % Mm. The alloy was formed in the same manner as Example 1, however, the furnace temperature was 750° C. and the wheel speed was 1400 rpm. This alloy has a storage capacity of about 7 wt. % hydrogen and absorbs 80% of the maximum capacity in less than 2.3 minutes at a temperature of about 275° C. Other details of the alloy properties are presented below.

The hydrogen storage alloys are unique in their combination of high storage capacity and excellent absorption/desorption kinetics. A combination of both alloy composition and particle size of the hydrogen storage material have a significant effect on the kinetics. That is, the kinetics of the material (regardless of specific composition) improve with decreasing particle size. Specifically, materials having a particle size under 70 microns are the most useful. More specifically, a 30–70 micron particle size gives excellent kinetics while still being capable of being easily manufactured. Increasing particle size eases manufacturing, but drastically reduces the kinetics of the material, while decreasing particle size via grinding is difficult because of the high ductility of these Mg based alloys. In fact, the use of gas atomization may be required in industry to manufacture bulk quantities of the particulate alloy specifically because the alloys are too ductile to be ground efficiently. One other important point to note about the such alloys is that, even when hydrided, these finely ground powders do not self-ignite and burn in air, in contradistinction to pure magnesium hydride powders. However, if desired, a monoatomic layer of a material which protects the particles but passes hydrogen (such as carbon, nickel or a polymeric material) may be coated thereon.

Figure 5:
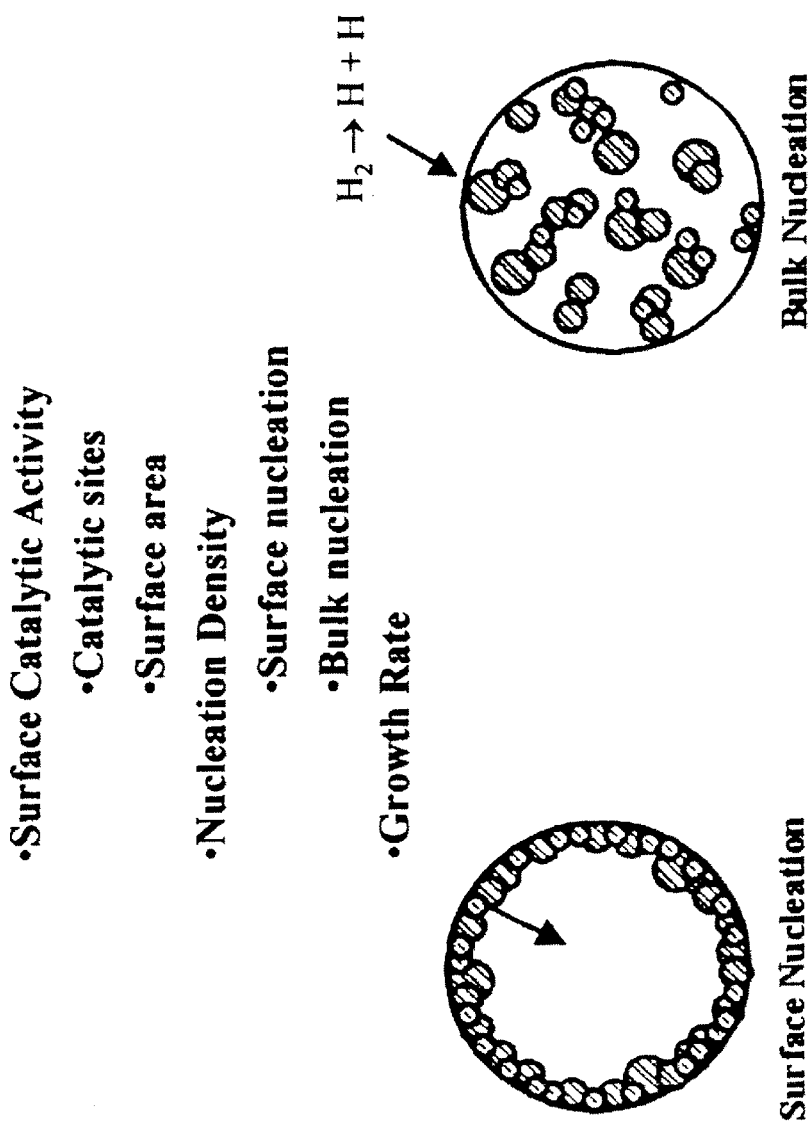
FIG. 5 is a graphical, stylistic depiction of the characteristics required by hydrogen storage alloys in order for such alloys to have desired kinetic properties, specifically depicted is surface versus bulk nucleation.

FIG. 5 is a graphical, stylistic depiction of characteristics required by hydrogen storage alloys in order for such alloys to have the kinetic properties required to propel fuel cell and internal combustion engines and schematically illustrates these concepts. Specifically, FIG. 5 shows how bulk nucleation, in addition to surface nucleation can increase the number of catalytic site for the dissociation of $H_2$ into 2H. Also, since particles having only surface nucleation sites will first adsorb hydrogen in the surface layer thereof, a sort of "barrier" is created on the surface which slows the further absorption of hydrogen. Thus, what is needed is a way to bypass this surface "barrier" and allow for absorption of hydrogen directly into the interior of the particle.

Small particles have unique properties that bridge the gap between crystalline and amorphous solids, i.e. small geometry gives rise to new physics. It is to be noted that 50 Angstrom particles are "mostly surface," thereby giving rise to new topologies and unusual bonding configurations. Also, 21% of all atoms in a 50 Angstrom particle are on the surface and another 40% are within one atom of the surface. Thus compositional disorder in multi-element micro-alloys is large in small particles, e.g. in a 50 Angstrom particle, each element in a 10 element alloy will show 3% variation in concentration just due to statistics. With such small particles, quantum confinement effects are apparent and band structure effects are disturbed.

This ability to atomically engineer the local chemical and electronic environments allows these environments to provide bulk nucleation within the particles. The instant inventors have found that, by applying the principles of atomic engineering and tailoring of the local chemical and electronic environment, magnesium can be modified to store more than 6 wt. % hydrogen, with significantly increased kinetics which allows for economic recovery of the stored hydrogen. The increased kinetics allows for the release of hydrogen at lower temperatures, thus increasing the utility of metal hydride storage in hydrogen based energy systems. Thus these alloys provide commercially viable, low cost, low weight hydrogen storage materials.

Figure 6:
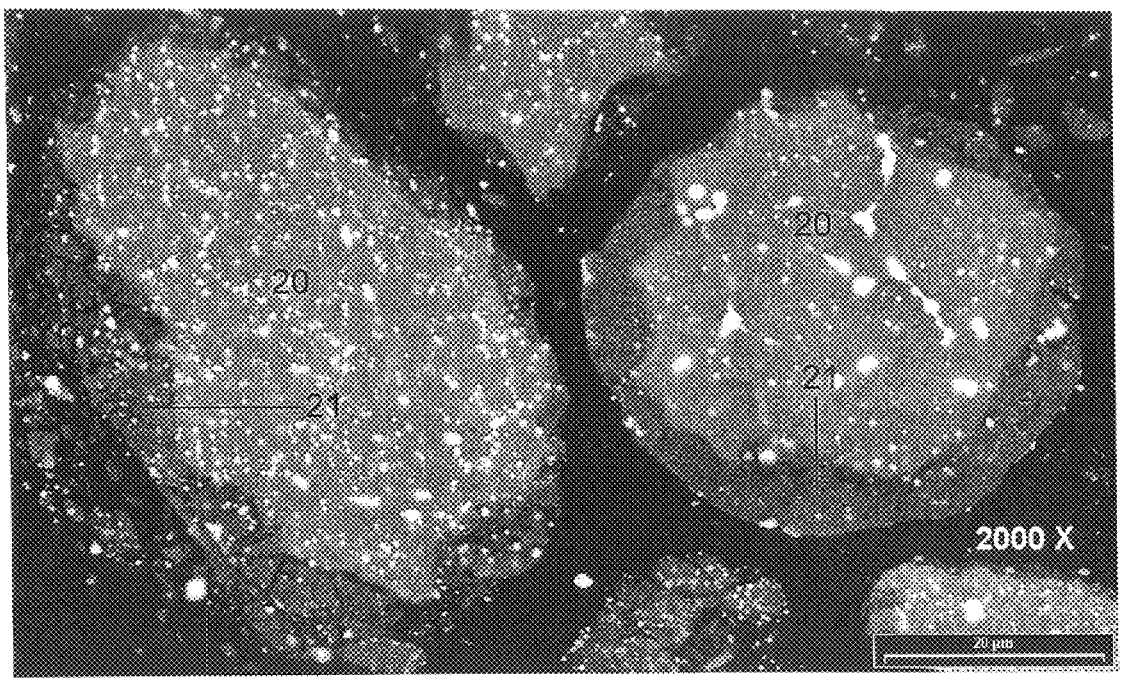
FIG. 6 is an SEM showing the effect of only surface nucleation on the hydriding of a magnesium based hydrogen storage alloy.

FIG. 6 is an SEM which confirms the effect of surface nucleation on hydriding of a magnesium based hydrogen storage alloy. The material in FIG. 6 initially only absorbs hydrogen at the surface nucleation sites there and hydrogen must thereafter diffuse into the interior or the particle. Specifically FIG. 6 shows a particle 20 in which only surface hydriding (nucleation) occurs 21. It should be noted that in FIGS. 6 and 7, the lighter areas are the non-hydrided portions of the material, while the darker areas are the hydrided portions of the material.

Figure 7:
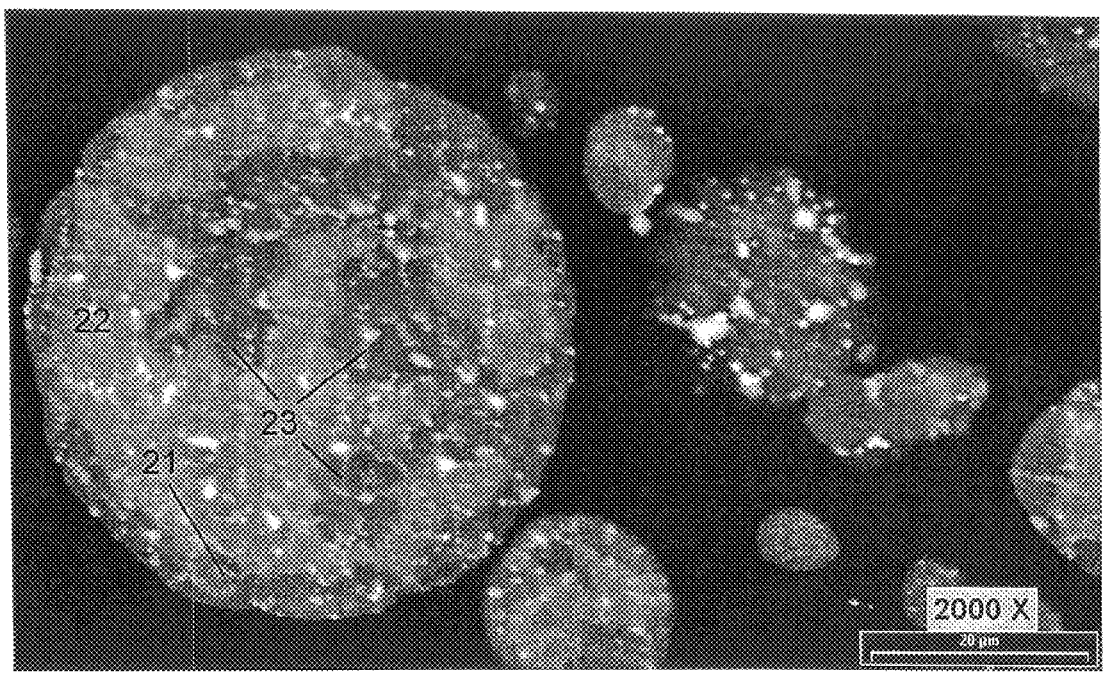
FIG. 7 is an SEM showing the effect of bulk nucleation on the hydriding of a magnesium based hydrogen storage alloy.

FIG. 7, on the other hand, is an SEM which confirms the effects of bulk nucleation (and the associated catalytic sites). The material in FIG. 7 initially absorbs hydrogen at the bulk nucleation sites and therefore hydrogen can more readily be absorbed into the interior of the particle. Specifically FIG. 7 shows another particle 22, which shows hydriding (via catalytic nucleation sites) within the bulk 23.

While this atomic engineering of the local chemical and electronic environments to provide both surface and bulk nucleation has been applied to thermal hydrogen storage materials, it can also be applied to other materials to affect the properties. For instance it can be applied to hydrogen storage materials in general (i.e. electrochemical or thermal) and to materials in general. Specifically desirable materials will be multi-elemental materials which may have been rapidly quenched. They will typically have small crystallite size, under 100 Angstroms and be particulate materials under 100 microns in size.

Figure 8:
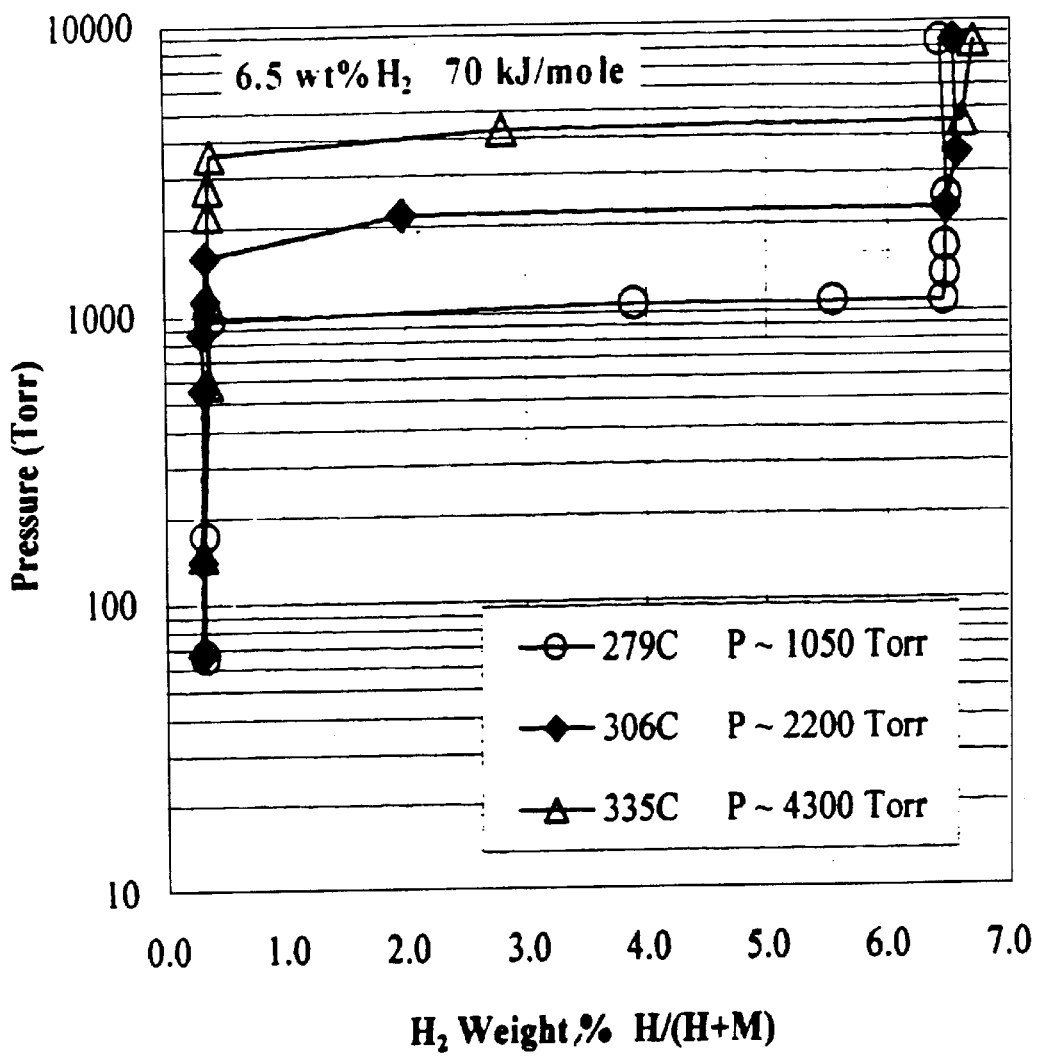
FIG. 8 is a graph of the Pressure Composition Temperature (PCT) curves of alloy FC-10 at 3 different temperatures.

FIG. 8 is a graph of the Pressure-Composition-Temperature (PCT) curves of alloy FC-10 at 279° C. (represented by the 0 symbol),306° C. (represented by the ▲ symbol) and 335° C. (represented by the Δ symbol). The graph shows that the alloy has plateau pressures of 1050 Torr at 279° C., 2200 Torr at 306° C. and 4300 Torr at 335° C. The PCT curve shows that the FC-10 alloy has a maximum capacity of about 6.5 weight % hydrogen, and a hydrogen bond energy of about 70 kJ/mole.

Figure 9:
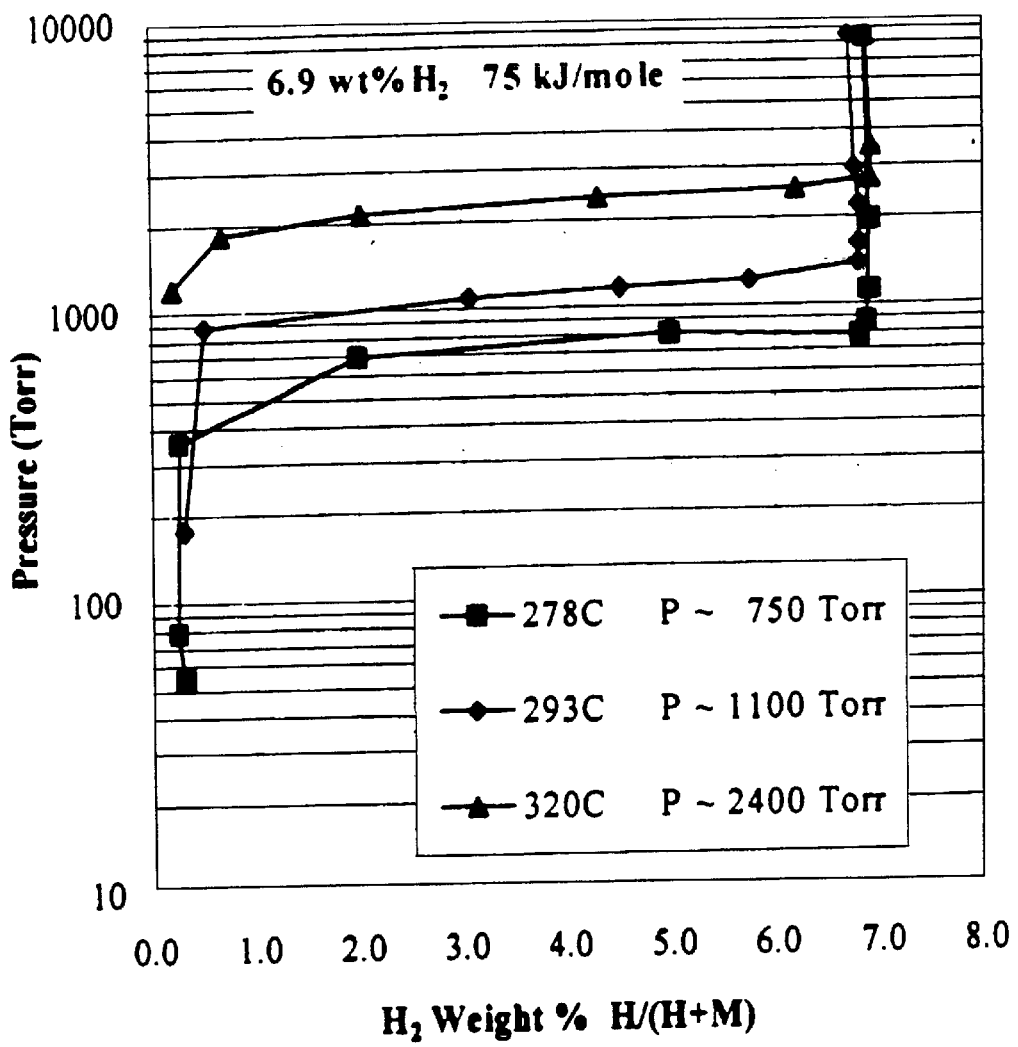
FIG. 9 is a graph of the PCT curves of alloy FC-76 at 3 different temperatures.

FIG. 9 is a graph of the PCT curves of alloy FC-76 at 278° C. (represented by the ■ symbol), 293° C. (represented by the ♦ symbol) and 320° C. (represented by the ▲ symbol). The graph shows that the alloy has plateau pressures of 750 Torr at 278° C., 1100 Torr at 293° C. and 2400 Torr at 320° C. The PCT curve shows that the FC-76 alloy has a maximum capacity of about 6.9 weight % hydrogen, and a hydrogen bond energy of about 75 kJ/mole.

Figure 10:
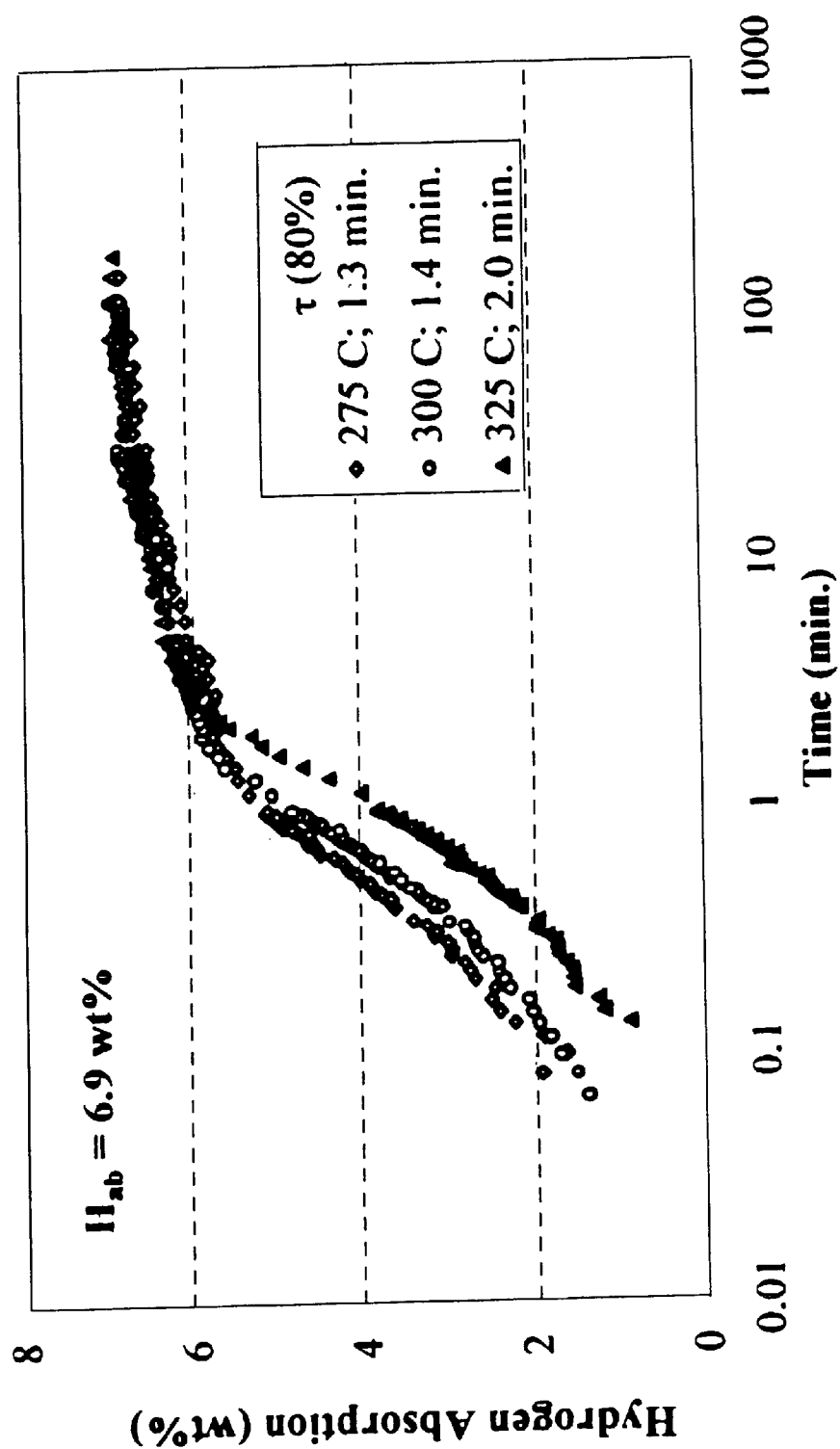
FIG. 10 is a plot of the absorption kinetics of the FC-76 alloy, specifically plotted is weight % hydrogen absorption versus time for 3 different temperatures.

FIG. 10 is a plot of the absorption kinetics of the FC-76 alloy. Specifically, weight % hydrogen absorption versus time is plotted for 3 temperatures 275° C. (◇ symbol), 300° C. (○ symbol), and 325° C. (Δ symbol). As can be seen, at 275° C. the alloy absorbs 80% of it's total capacity in 1.3 minutes, at 300° C. the alloy absorbs 80% of it's total capacity in 1.4 minutes, and at 325° C. the alloy absorbs 80% of it's total capacity in 2.0 minutes.

Figure 11:
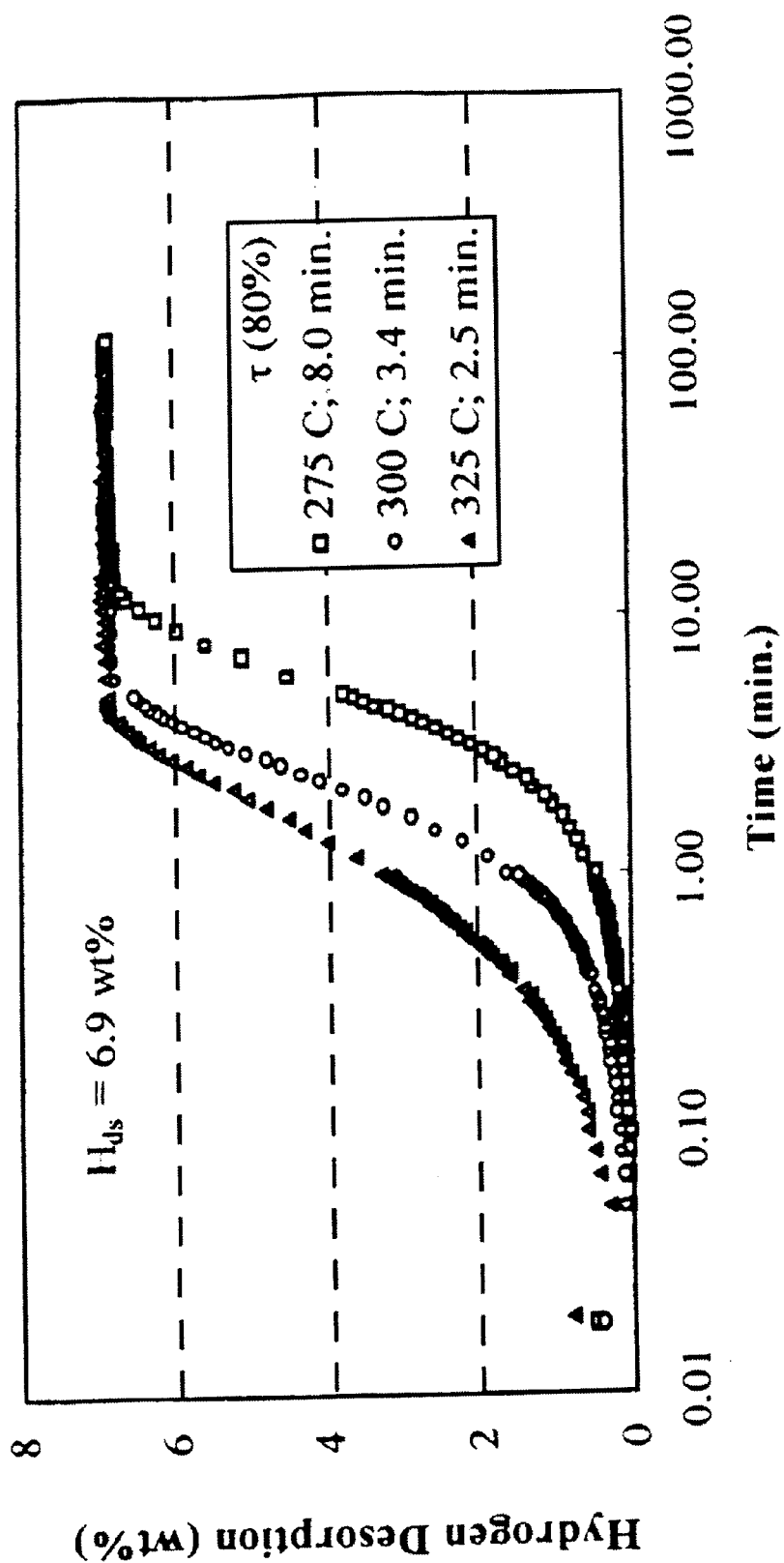
FIG. 11 is a plot of the desorption kinetics of the FC-76 alloy specifically plotted is weight % hydrogen desorption versus time for 3 different temperatures.

FIG. 11 is a plot of the desorption kinetics of the FC-76 alloy. Specifically, weight % hydrogen desorption versus time is plotted for 3 temperatures 275° C. (□ symbol), 300° C. (○ symbol), and 325° C. (Δ symbol). As can be seen, at 275° C. the alloy desorbs 80% of it's total capacity in 8.0 minutes, at 300° C. the alloy desorbs 80% of it's total capacity in 3.4 minutes, and at 325° C. the alloy debsorbs 80% of it's total capacity in 2.5 minutes.

Figure 12:
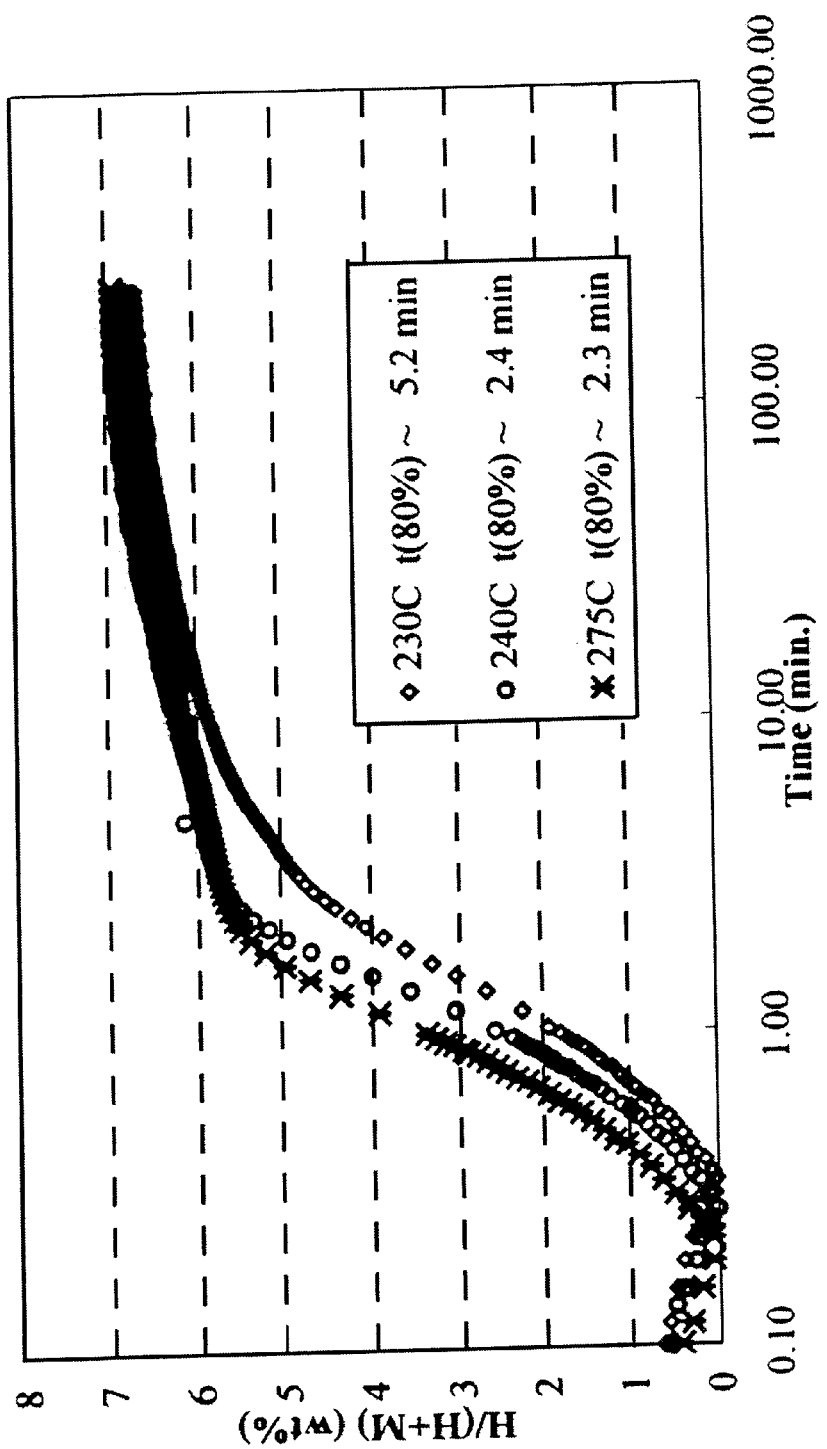
FIG. 12 is a plot of the absorption kinetics of the FC-86 alloy specifically plotted is weight % hydrogen desorption versus time for 3 different temperatures.

FIG. 12 is a plot of the absorption kinetics of the FC-86 alloy. Specifically, weight % hydrogen absorption versus time is plotted for 3 temperatures 230° C. (◇ symbol), 240° C. (○ symbol), and 275° C. (* symbol). As can be seen, at 230° C. the alloy absorbs 80% of it's total capacity in 5.2 minutes, at 300° C. the alloy absorbs 80% of it's total capacity in 2.4 minutes, and at 325° C. the alloy absorbs 80% of it's total capacity in 2.3 minutes.

Figure 13:
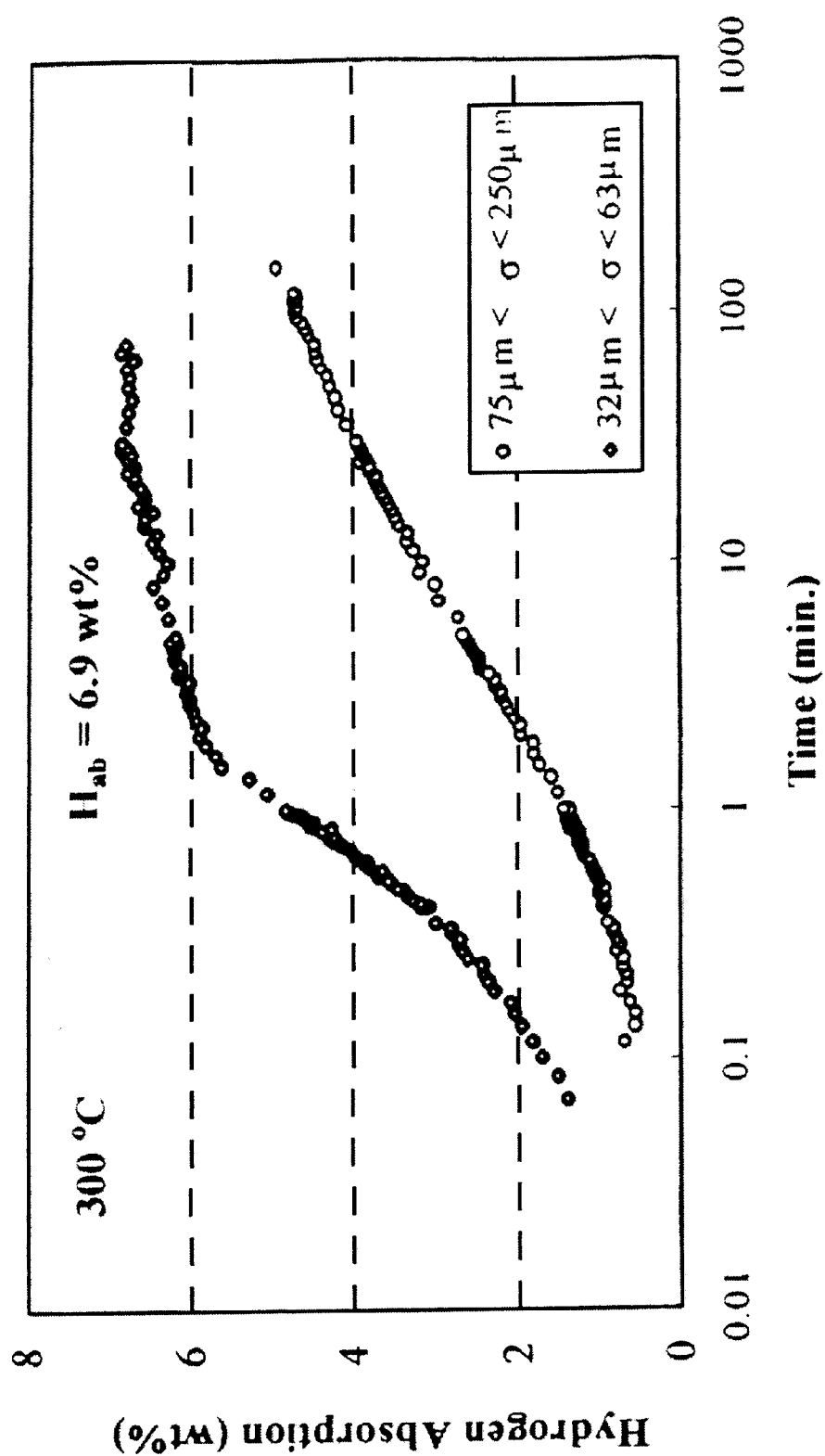
FIG. 13 is a plot of the absorption kinetics of FC-76 alloy powders having two different particle sizes.

FIG. 13 is a plot of the absorption kinetics of FC-76 alloy powders having two different particle sizes. Specifically, weight % hydrogen absorption versus time is plotted for material having a particle size range of 75–250 microns (○ symbol), and 32–63 microns (◇ symbol). As can be seen, the smaller particle size greatly enhances the absorption kinetics.

Figure 14:
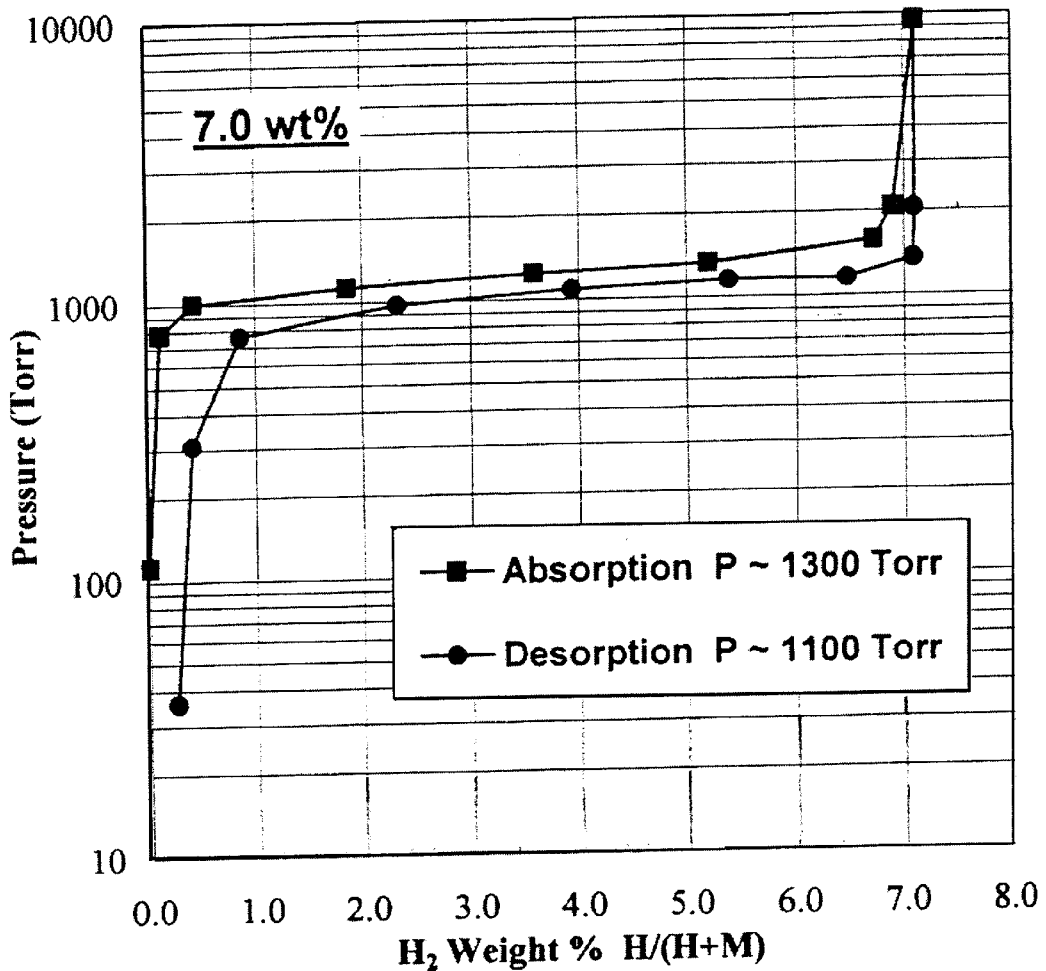
FIG. 14 is a graphical plot of the absorption and desorption PCT curves for a 7% magnesium based Ovonic thermal hydrogen storage alloy, specifically to be noted is the lack of any major hysteresis of this material.

FIG. 14 is a graphical plot of the absorption (■ symbol) and desorption (● symbol) PCT curves at 300° C. for a 7 weight % storage capacity Ovonic thermal hydrogen storage alloy according to the instant invention. It should be noted that this material lacks any major hysteresis. That is, virtually all of the absorbed hydrogen is recovered upon desorption. Thus hydrogen storage in this alloy is completely reversible.

While the method of forming the hydrogen storage alloy powders in the examples above was rapid solidification and subsequent grinding, gas atomization may also be used. When the materials are ground, use of an attritor is the preferred method of grinding. Particularly useful is the addition of a grinding agent, such as carbon, when grinding these alloys.

The hydrogen storage subsystem 34 includes a metal hydride hydrogen storage means for storing hydrogen within a container or tank. In one embodiment, the storage means comprises the afore described hydrogen storage alloy material physically bonded to a support means. Generally, the support means can take the form of any structure that can hold the storage alloy material. Examples of support means include, but are not limited to, mesh, grid, matte, foil, foam and plate. Each may exist as either a metal or non-metal.

The support means may be formed from a variety of materials with the appropriate thermodynamic characteristics that can provide the necessary heat transfer mechanism. These include both metals and non-metals. Preferable metals include those from the group consisting of Ni, Al, Cu, Fe and mixtures or alloys thereof. Examples of support means that can be formed from metals include wire mesh, expanded metal and foamed metal.

The hydrogen storage alloy material may be physically bonded to the support means by compaction and/or sintering processes. The alloy material is first converted into a fine powder. The powder is then compacted onto the support means. The compaction process causes the powder to adhere to and become an integral part of the support means. After compaction, the support means, which has been impregnated with alloy powder, is preheated and then sintered. The preheating process liberates excess moisture and discourages oxidation of the alloy powder. Sintering is carried out in a high temperature, substantially inert atmosphere containing hydrogen. The temperature is sufficiently high to promote particle-to-particle bonding of the alloy material as well as the bonding of the alloy material to the support means.

Figure 15:
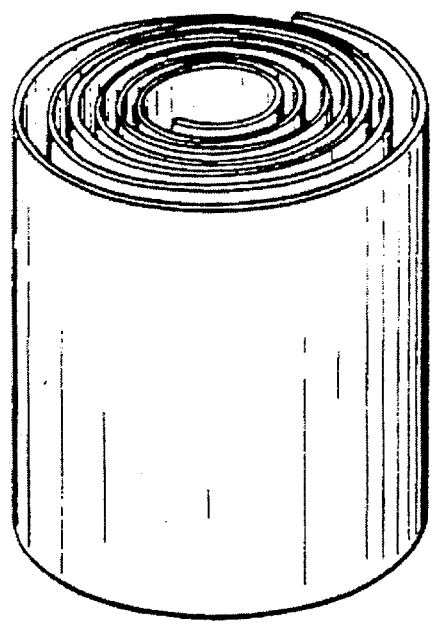
FIG. 15 shows a support means bonded with a hydrogen storage alloy material spirally wound into a coil.
Figure 16:
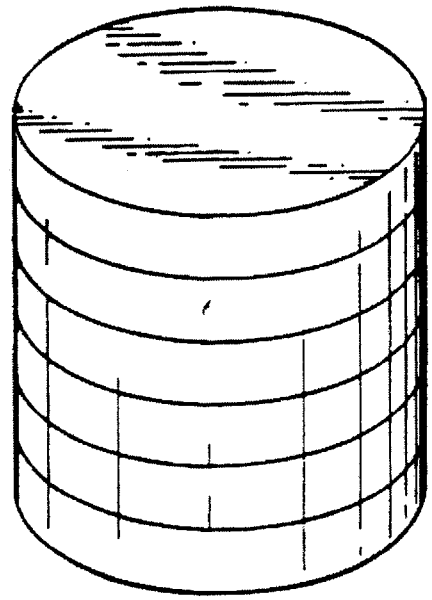
FIG. 16 shows a support means bonded with a hydrogen storage alloy material assembled as a plurality of stacked disks.

The support means/alloy material can be packaged within the container/tank in many different configurations. FIG. 15 shows a configuration where the support means/alloy material is spirally wound into a coil. FIG. 16 shows an alternate configuration where the support means/alloy material is assembled in the container as a plurality of stacked disks. Other configurations are also possible (e.g. stacked plates).

Compacting and sintering alloy material onto a support means increases the packing density of the alloy material, thereby improving the thermodynamic and kinetic characteristics of the hydrogen storage system. The close contact between the support means and the alloy material improves the efficiency of the heat transfer into and out of the hydrogen storage alloy material as hydrogen is absorbed and desorbed. In addition, the uniform distribution of the support means throughout the interior of the container provides for an even temperature and heat distribution throughout the bed of alloy material. This results in a more uniform rate of hydrogen absorption and desorption throughout the entirety thereof, thus creating a more efficient energy storage system.

One problem when using just an alloy powder (without a support means) in hydrogen storage beds is that of self-compaction due to particle size reduction. That is, during repeated hydriding and dehydriding cycles, the alloy materials expand and contract as they absorb and desorb hydrogen. Some alloy materials have been found to expand and contract by as much as 25% in volume as a result of hydrogen introduction into and release from the material lattice. As a result of the dimensional change in the alloy materials, they crack, undergo fracturing and break up into finer and finer particles. After repeated cycling, the fine particles self-compact causing inefficient hydrogen transfer as well as high stresses that are directed against the walls of the storage container.

However, the processes used to attach the alloy material onto the support means keeps the alloy particles firmly bonded to each other as well as to the support means during the absorption and desorption cycling. Furthermore, the tight packaging of the support means within the container serves as a mechanical support that keeps the alloy particles in place during the expansion, contraction and fracturing of the material.

The Hydrogen Transportation Subsystem 35

Once the hydrogen has been stored in hydride tanks or in the storage/compressor at subsystem 34, the hydrogen needs to be transported from one location to another. This is achieved via conventional shipping of storage tanks full of hydrided hydrogen storage alloy. Since, these tanks are completely safe from risks of fire and explosion, it will be a simple matter to transport them via conventional shipping means. These include shipment via any or all of truck, train, boat, or barge. The tanks can be handled and stowed conventionally, such as via tank racks or other means for securing them to their transport vehicle.

The Hydrogen Distribution Network Subsystem 36

After the hydrogen is transported, subsystem 35 it is delivered to a distribution network. This distribution network includes hydrogen storage facilities including vehicle refueling stations, home use distributors and industrial/business distributors. When the hydrogen tanks arrive (via boat, barge, truck, train, etc.,) the hydrogen can be handled in one of two ways. First the storage tanks (or cylinders, etc.) can physically be offloaded to the distributor (or a truck trailer can be left behind) and the empty tanks, from which hydrogen has already been distributed, can be retrieved for refueling. Otherwise, hydrogen can be transferred from the transported storage tanks to a fixed storage tank (also preferably a hydride storage bed) at the distributor's location.

The distribution subsystem 35 can include the combine bulk storage/single stage metal hydride compressor of the instant invention and also may include the hydrogen refueling station of FIG. 2, both described hereinabove.

The Hydrogen End-Use Subsystem 37

Finally, the hydrogen which is stored at the facilities of the distribution network 36 is transferred to the final consumer. The final consumer use may be for powering a vehicle, in which case the consumer would refill the vehicle at a refueling station such as the described herein above. The final use may also be a home use such as those already using natural gas (e.g., for heating, hot water, cloths drying, cooking, etc.). In this case, the hydrogen may be delivered to the home and stored in a hydride storage tank onsite, or the hydrogen may be piped into the home via a local pipeline distribution network (much more economical than a nationwide distribution network because of long distance pressure requirements and losses). Finally the end use may be of a business or industrial nature. Again, the options for this consumer would be delivery to the site and onsite storage, or local pipeline distribution.

Hydrogen Powered Internal Combustion Engine and Fuel Cell Vehicles

The instant alloys, storage material systems and infrastructure are useful as hydrogen supplies for many applications. One such application is the field of automobiles. Specifically, infrastructure system can be used as a means to supply hydrogen to automobiles and the storage systems can be used as a source of hydrogen for internal combustion engine (ICE) or fuel cell (FC) of such vehicles.

Figure 17:
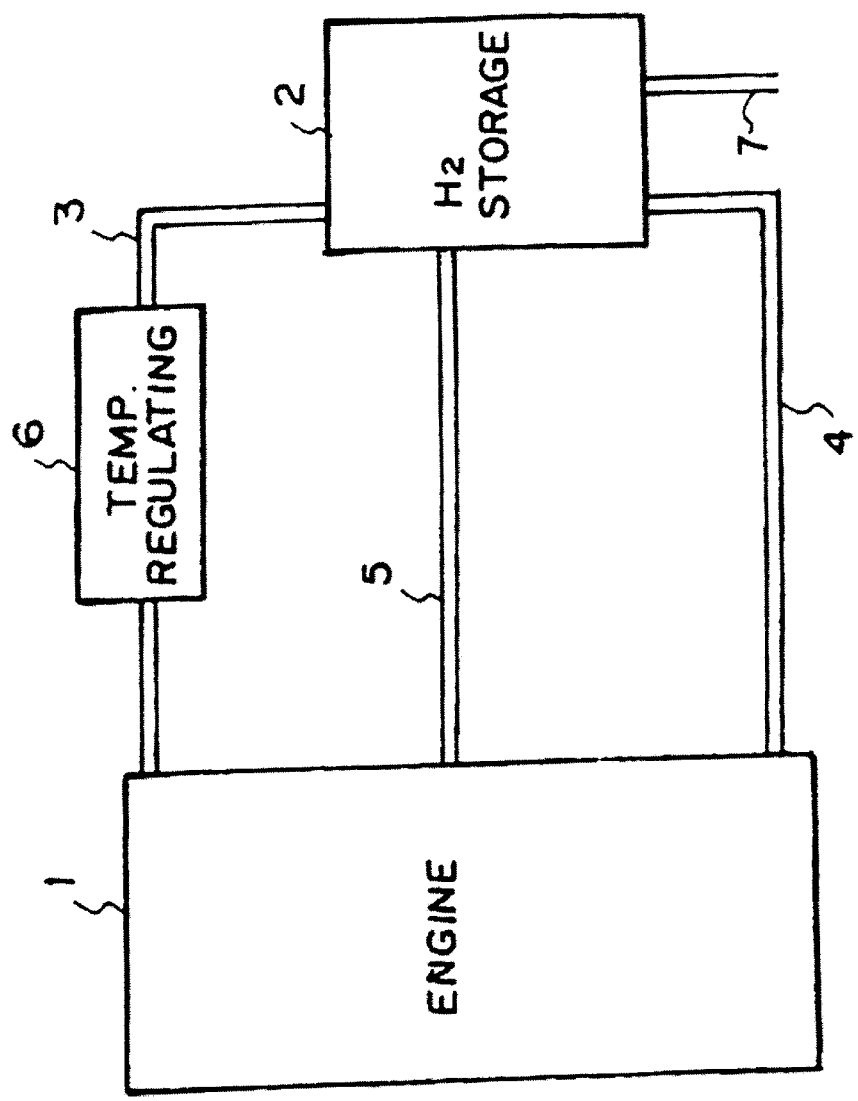
FIG. 17 shows a schematic representation of a hydrogen gas supply system for powering an internal combustion engine vehicle.

FIG. 17 shows a schematic representation of a hydrogen gas supply system for an ICE vehicle, which is for supplying a hydrogen engine 1 with hydrogen gas. The system has a hydrogen gas storage portion 2 and an engine waste heat transfer supply passage 3 which leads engine waste heat (in the form of exhaust gas or engine coolant) discharged from the engine 1 to the hydrogen gas storage portion 2. The system also includes a return passage 4 for returning any engine coolant used to heat the hydrogen storage material back to the engine 1 and an exhaust gas vent 7 for releasing used exhaust gas. The system further includes a hydrogen gas supply passage 5 which leads hydrogen gas from the hydrogen gas storage portion 2 to the engine 1. The engine waste heat transfer supply passage 3 is provided with a temperature regulating portion 6 which regulates the temperature of the waste heat to be introduced into the hydrogen gas storage portion 2. With such a system, waste heat generated within the ICE can be efficiently used to heat the hydrogen storage material to release hydrogen therefrom for use in the ICE.

Figure 18:
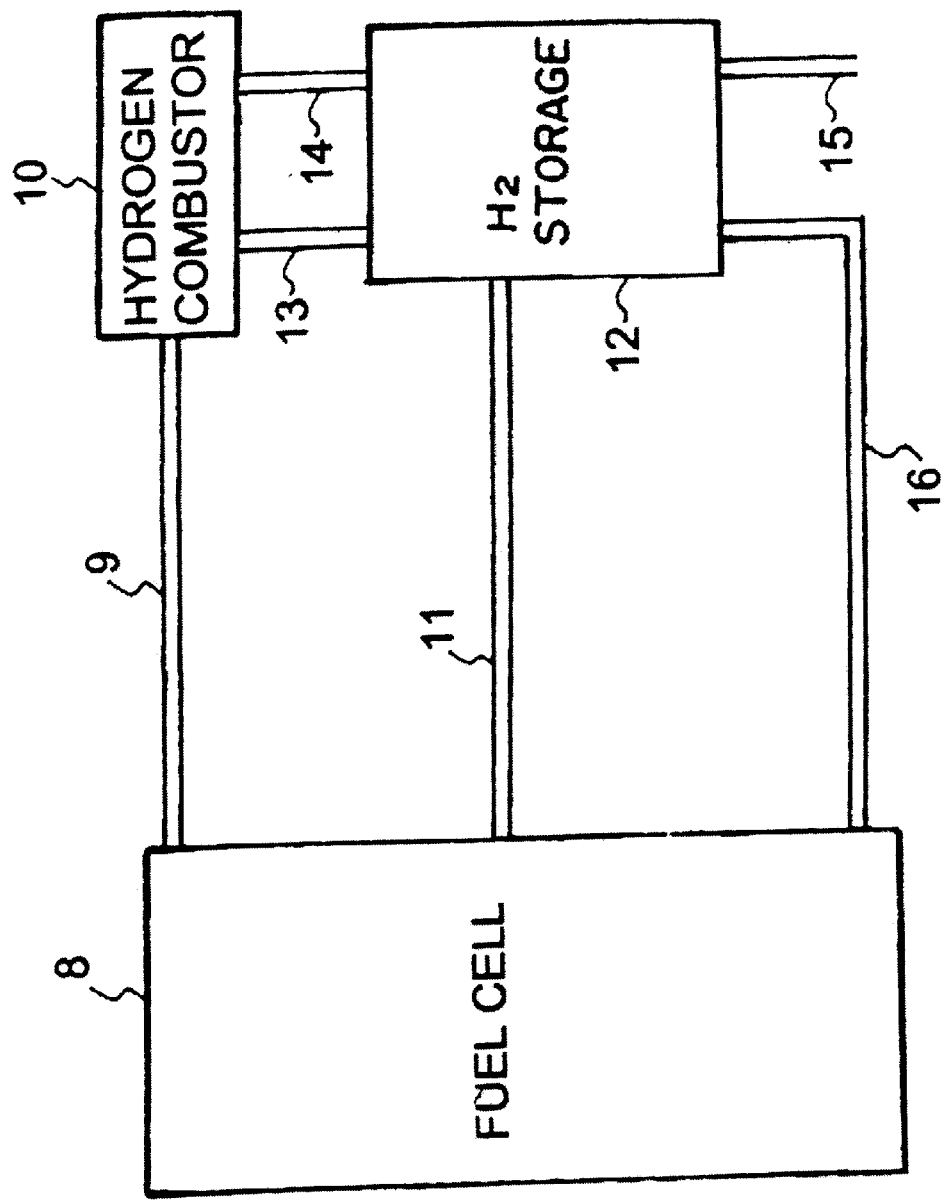
FIG. 18 shows a schematic representation of a hydrogen gas supply system for powering for a fuel cell vehicle.

FIG. 18 shows a schematic representation of a hydrogen gas supply system for an FC vehicle, which is for supplying a fuel cell 8 with hydrogen gas. The system has a hydrogen gas storage portion 12 and a fuel cell waste heat/hydrogen transfer supply passage 9 which leads fuel cell waste heat and unused hydrogen discharged from the fuel cell 8 to a hydrogen gas combustor 10. Waste heat from the fuel cell may be in the form of heated gases or heated aqueous electrolyte. The hydrogen combustor 10, heats a thermal transfer medium (preferably in the form of the aqueous electrolyte from the fuel cell) utilizing waste heat from the fuel cell 8, and by combusting hydrogen. Hydrogen is supplied to the combustor 10 via unused hydrogen from the fuel cell 8, and via fresh hydrogen supplied from the hydrogen storage unit 12 via hydrogen supply line 14. Heated thermal transfer medium is supplied to the hydrogen storage unit 12 via supply line 13. The system also includes a return passage 16 for returning any fuel cell aqueous electrolyte used to heat the hydrogen storage material back to the fuel cell 8 and an exhaust gas vent 15 for releasing used combustor gas. The system further includes a hydrogen gas supply passage 11 which leads hydrogen gas from the hydrogen gas storage-unit 12 to the fuel cell 8.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

What is claimed is:

1. A bulk hydrogen storage alloy having a plateau pressure of less than or equal to 500 psi at a temperature of less than or equal to 25° C. and a plateau pressure greater than or equal to 1500 psi at a temperature of less than or equal to 200° C.

2. The bulk hydrogen storage alloy of claim 1, wherein said hydrogen storage alloy has a plateau pressure less than or equal to 400 psi at a temperature of less than or equal to 25° C. and a plateau pressure greater than or equal to 2000 psi at a temperature of less than or equal to 200° C.

3. The bulk hydrogen storage alloy of claim 1, wherein said hydrogen storage alloy has a plateau pressure less than or equal to 300 psi at a temperature of less than or equal to 25° C. and a plateau pressure greater than or equal to 3600 psi at a temperature of less than or equal to 200° C.

4. The bulk hydrogen storage alloy of claim 1, wherein said hydrogen storage alloy has a plateau pressure less than or equal to 200 psi at a temperature of less than or equal to 25° C. and a plateau pressure greater than or equal to 5000 psi at a temperature of less than or equal to 200° C.

5. The bulk hydrogen storage alloy of claim 1, wherein said hydrogen storage alloy has a plateau pressure of about 100 psi at a temperature of about 12° C. and a plateau pressure of about 6000 psi at a temperature of about 180° C.

6. The bulk hydrogen storage alloy of claim 1, wherein said hydrogen storage alloy comprises an $AB_2$ alloy.

7. The bulk hydrogen storage alloy of claim 6, wherein said hydrogen storage alloy comprises a modified $Ti$—$Mn_2$ alloy.

8. The bulk hydrogen storage alloy of claim 7, wherein said hydrogen storage alloy comprises, in atomic percent 2–5% Zr, 26–32% Ti, 7–10% V, 8–20% Cr, 38–42% Mn; and at least one element selected from the group consisting of 1–6% Ni, 2–6% Fe and 0.1–2% Al.

9. The bulk hydrogen storage alloy of claim 8, wherein said hydrogen storage alloy further comprises up to 1 atomic percent Misch metal.

10. The bulk hydrogen storage alloy of claim 9, wherein said hydrogen storage alloy comprises, in atomic percent 3.63% Zr, 29.8% Ti, 8.82% V, 9.85% Cr, 39.5% Mn, 2.0% Ni, 5.0% Fe, 1.0% Al, and 0.4% Misch metal.

11. The bulk hydrogen storage alloy of claim 8, wherein said hydrogen storage alloy comprises, in atomic percent 3.6% Zr, 29.0% Ti, 8.9% V, 10.1% Cr, 40.1% Mn, 2.0% Ni, 5.1% Fe, and 1.2% Al.

12. The bulk hydrogen storage alloy of claim 8, wherein said hydrogen storage alloy comprises, in atomic percent 3.6% Zr, 28.3% Ti, 8.8% V, 10.0% Cr, 40.7% Mn, 1.9% Ni, 5.1% Fe, and 1.6% Al.

13. The bulk hydrogen storage alloy of claim 8, wherein said hydrogen storage alloy comprises, in atomic percent 4% Zr, 29.5% Ti, 8.5% V, 15.0% Cr, 38% Mn, 5% Ni.

* * * * *